US008010387B2

(12) United States Patent
Porter et al.

(10) Patent No.: US 8,010,387 B2
(45) Date of Patent: Aug. 30, 2011

(54) METHOD, COMPUTER PROGRAM PRODUCT, AND SYSTEM FOR RISK MANAGEMENT

(75) Inventors: Keith Alan Porter, Pasadena, CA (US); James Leslie Beck, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1680 days.

(21) Appl. No.: 10/862,185

(22) Filed: Jun. 4, 2004

(65) Prior Publication Data

US 2005/0049962 A1 Mar. 3, 2005

Related U.S. Application Data

(60) Provisional application No. 60/475,744, filed on Jun. 4, 2003.

(51) Int. Cl.
*G06Q 40/00* (2006.01)
(52) U.S. Cl. .................. 705/4; 705/405; 705/38
(58) Field of Classification Search .................. 705/7, 4, 705/38
See application file for complete search history.

(56) References Cited

U.S. PATENT DOCUMENTS

| | | | | |
|---|---|---|---|---|
| 7,386,463 B2 * | 6/2008 | McCabe | .................. | 705/4 |
| 2002/0026478 A1 * | 2/2002 | Rodgers et al. | .................. | 709/205 |
| 2003/0046128 A1 * | 3/2003 | Heinrich | .................. | 705/7 |
| 2004/0153346 A1 * | 8/2004 | Grundel et al. | .................. | 705/4 |
| 2004/0215551 A1 * | 10/2004 | Eder | .................. | 705/38 |

OTHER PUBLICATIONS

American Society for Testing and Materials (ASTM), 1999, E 2026-99 Standard Guide for the Estimation of Building Damageability in Earthquakes, West Conshohocken, PA.
Applied Technology Council., 1985, ATC-13: Earthquake Damage Evaluation Data for California, Redwood City, CA.
Beck, J.L., Kiremidjian, A.S., Wilkie, S., Mason, A., Salmon, T., Goltz, J., Olson, R., Workman, J., Irfanoglu, A., and Porter, K., 1999, Decision Support Tools for Earthquake Recovery of Businesses, Final Report, CUREe-Kajima Joint Research Program Phase III, Consortium of Universities for Earthquake Engineering Research, Richmond, CA.
Beck, J.L., Porter, K.A., Shaikhutdinov, R.V., Au, S.K., Moroi, T., Tsukada, Y., and Masuda, M., 2002, Impact of Seismic Risk on Lifetime Property Values, Final Report, Consortium of Universities for Research in Earthquake Engineering, Richmond, CA, http://resolver.caltech.edu/caltechEERL:2002.EERL-2002-04.
Holland, A.S., Ott, S.H., and Riddiough, T.J., 2000, The role of uncertainty in investment: an examination of competing investment models using commercial real estate data: Real Estate Economics, 28, 33-64.
Insurance Information Institute, 2003, Facts and Statistics: Homeowners Insurance, www.iii.org/media/facts/statsbvissue/homeowners/.

(Continued)

*Primary Examiner* — Charles R. Kyle
*Assistant Examiner* — Siegfried E. Chencinski
(74) *Attorney, Agent, or Firm* — Tope-McKay & Associates

(57) ABSTRACT

The present invention comprises a method, computer program product, and system for risk management. The present invention includes calculating a statistic of loss per unit time, the statistic being a product of a site loss parameter and a loss given a loss-basis event. The site loss parameter is a site casualty parameter and/or a site economic parameter, while the loss-basis event is a casualty-basis event and/or an economic-basis event, non-limiting examples of which include an earthquake, flooding, wind, and blast pressure.

68 Claims, 9 Drawing Sheets

Mean assembly vulnerability functions for five assembly types (d shows two to save space).

OTHER PUBLICATIONS

National Institute of Building Sciences (NIBS) and Federal Emergency Management Agency (FEMA), 1999a, HAZUS-99 Software, FEMA, Washington, DC, www.fema.gov/hazus/.

National Institute of Building Sciences (NIBS) and Federal Emergency Management Agency (FEMA), 1999b, HAZUS Technical Manual, FEMA, Washington, DC, www.fema.gov/hazus/.

Porter, K.A., 2003a, PEER Testbeds Homepage, http://www.peertestbeds.net.

Porter, K.A., 2003b, An Overview of PEER's Performance-Based Earthquake Engineering Methodology, Proc. Ninth International Conference on Applications of Statistics and Probability in Civil Engineering (ICASP9) Jul. 6-9, 2003, San Francisco, CA.

Porter, K.A., Beck, J.L., and Shaikhutdinov, R.V., 2002a, Sensitivity of building loss estimates to major uncertain variables: Earthquake Spectra, 18 (4), Earthquake Engineering Research Institute, Oakland, CA, 719-743, http://keithp.caltech.edu/publications.htm.

Porter, K.A., Beck, J.L., Seligson, H.A., Scawthorn, C.R., Tobin, L.T., and Boyd, T., 2002b, Improving Loss Estimation for Woodframe Buildings, Consortium of Universities for Research in Earthquake Engineering, Richmond, CA. http://resolver.library.caltech.edu/caltechEERL:2002.EERL-2002-01 (main report) and http://resolver.library.caltech.edu/caltechEERL:2002.EERL-2002-02 (appendices).

Porter, K.A., Kiremidjian, AS. and LeGrue, J.S., 2001, Assembly-based vulnerability of buildings and its use in performance evaluation: Earthquake Spectra, 17 (2), Earthquake Engineering Research Institute, Oakland, CA, 291-312.

Reitherman, R., and K. Cobeen, in press, Design Documentation of the Woodframe Project Index Buildings, Consortium of Universities for Research in Earthquake Engineering (CUREE), Richmond, CA.

Risk Engineering, 2002, ST-RISK Software, Version 3.2, www.st-risk.com.

Rubin, H.W., 1991, Dictionary of Insurance Terms, Barron's Educational Services Inc., New York, NY.

Zadeh, M.M., 2000, Understanding risk management: Financial Management of Earthquake Risk, Earthquake Engineering Research Institute, Oakland CA, 1-14.

Czarnecki, R.M., 1973, Earthquake Damage to Tall Buildings, Structures Publication 359, Massachusetts Institute of Technology, Cambridge, MA.

Federal Emergency Management Agency (FEMA), 1997, FEMA 273, NEHRP Guidelines for the Seismic Rehabilitation of Buildings, Washington, DC.

Howard, R.A., and J.E. Matheson, eds., 1989, Readings on the Principles and Applications of Decision Analysis, Strategic Decisions Group, Menlo Park, CA.

International Code Council, 2000, International Building Code 2000, International Conference of Building Officials, Whittier, CA.

Spetzler. C.S., 1968, The development of a corporate risk policy for capital investment decisions: IEEE Transactions on Systems Science and Cybernetics, vol. SSC-4, No. 3., Sep. 1968, Institute of Electronics and Electrical Engineers, pp. 279-300, reprinted in R.A. Howard and J. E. Matheson, eds., 1989, Readings on the Principles and Applications of Decision Analysis, vol. 2: Professional Collection, Strategic Decisions Group, Menlo Park, CA, 667-688.

Trifunac, M.D., and Brady, A.G., 1975, On the correlation of seismic intensity scales with the peaks of recorded strong ground motion: Bulletin of the Seismological Society of America, 65, 139-162.

\* cited by examiner

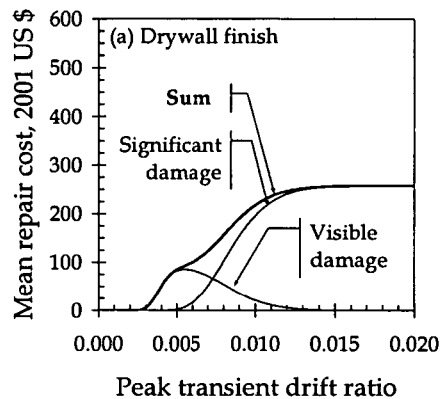
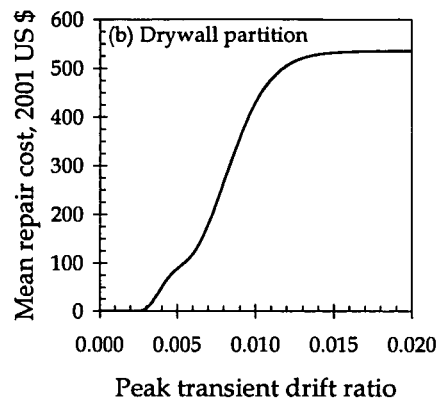
FIG. 1(a)　　　　　　　　　FIG. 1(b)
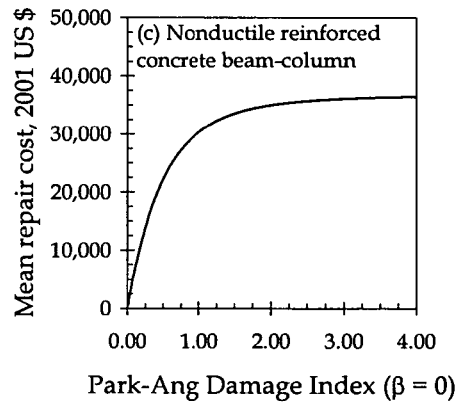
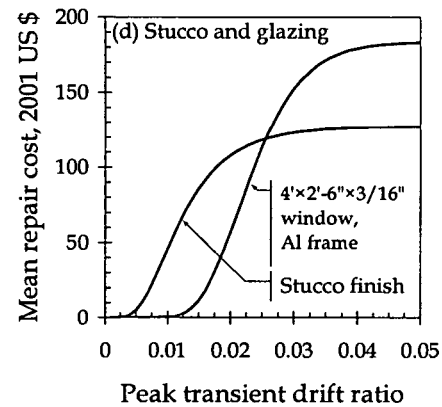
FIG. 1(c)　　　　　　　　　FIG. 1(d)
Mean assembly vulnerability functions for five assembly types (d shows two to save space).
FIG. 1

| Assembly description | Unit | Limit state; repair | EDP[1] | Capacity $\hat{x}$ | $\beta$ | Cost, $ $\hat{x}$ | $\beta$ |
|---|---|---|---|---|---|---|---|
| Stucco finish, 7/8", 3-5/8" metal stud, 16"OC | 64 sf | 1. Cracking; patch | PTD | 0.012 | 0.5 | 125 | 0.2 |
| Drywall fin., 5/8-in., 1 side, metal stud, screws | 64 sf | 1. Visible dmg; patch | PTD | 0.0039 | 0.17 | 88 | 0.2 |
| Drywall fin., 5/8-in., 1 side, metal stud, screws | 64 sf | 2. Signif. dmg; replace | PTD | 0.0085 | 0.23 | 253 | 0.2 |
| Drywall ptn, 5/8-in., 1 side, metal stud, screws | 64 sf | 1. Visible dmg; patch | PTD | 0.0039 | 0.17 | 88 | 0.2 |
| Drywall ptn, 5/8-in., 1 side, metal stud, screws | 64 sf | 2. Signif. dmg; replace | PTD | 0.0085 | 0.23 | 525 | 0.2 |
| Nonductile CIP RC beam or column | ea | 1. Light; epoxy | PADI | 0.080 | 1.36 | 8000 | 0.42 |
| Nonductile CIP RC beam or column | ea | 2. Moderate; jacket | PADI | 0.31 | 0.89 | 20500 | 0.4 |
| Nonductile CIP RC beam or column | ea | 3, 4. Severe or collapse; replace | PADI | 0.71 | 0.8 | 34300 | 0.37 |
| Window, Al frame, sliding, hvy sheet glass... | ea | 1. Cracking; replace | PTD | 0.023 | 0.28 | 180 | 0.2 |
| Paint on exterior stucco or concrete | sf | Paint | (2) | N/A |  | 1.45 | 0.2 |
| Paint on interior concrete, drywall, or plaster | sf | Paint | (2) | N/A |  | 1.52 | 0.2 |

(1) PTD = peak transient drift ratio; PADI = $(\phi_m - \phi_y)/(\phi_u - \phi_y)$, where $\phi_m$ = maximum curvature, $\phi_y$ = yield curvature, $\phi_u$ = curvature at maximum moment
(2) Paint entire room, hallway, etc. to achieve reasonable uniform appearance if any component requires painting.

Summary of assembly fragility parameters and cost distributions (Beck et al. 2002).

FIG. 2

|  | Van Nuys |
|---|---|
| $S_{NZ}$ | 0.05g |
| $S_{EBE}$ | 0.20g |
| $G(S_{NZ})$, yr$^{-1}$ | 0.1026 |
| $G(S_{EBE})$, yr$^{-1}$ | 0.0195 |
| $H$, yr$^{-1}$ | 0.0617 |
| PFL methods 1 and 2 | $613,000 |
| method 3 | $930,000 |
| EAL method 1 | $53,600 |
| method 2 | $37,800 |
| method 3 | $57,400 |

Approximation of earthquake loss using probable frequent loss (*PFL*).

Dominance of frequent events in expected annualized loss for Van Nuys building.

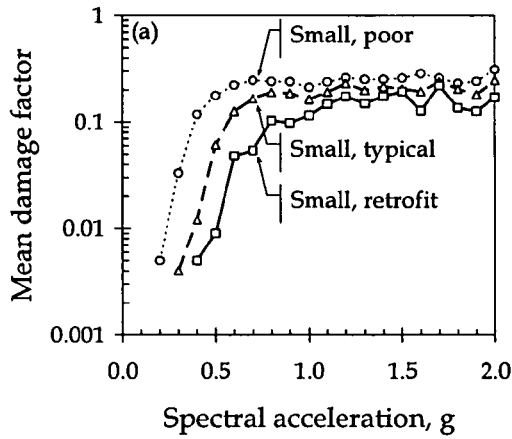
FIG. 6(a)
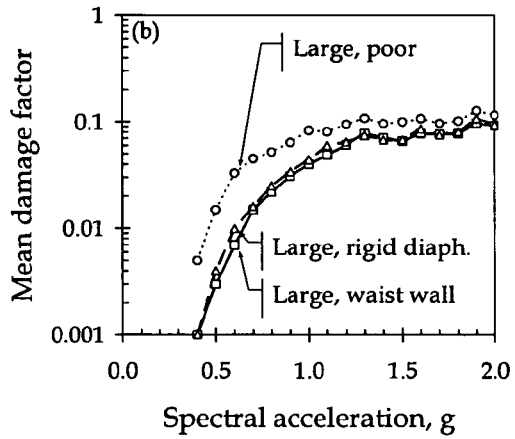
FIG. 6(b)
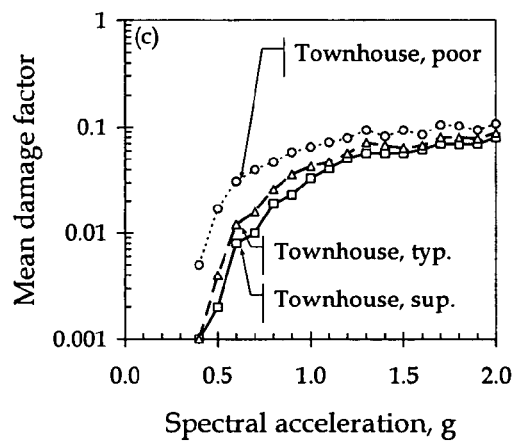
FIG. 6(c)
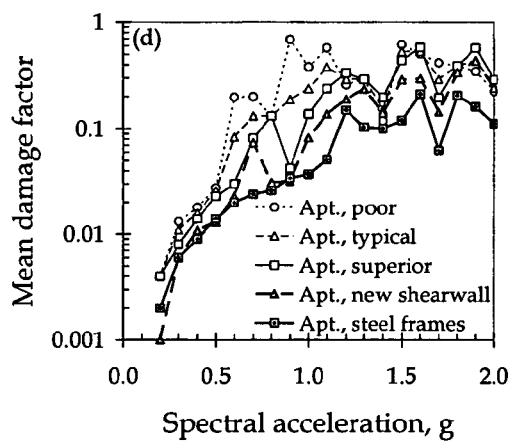
FIG. 6(d)
CUREE-Caltech Woodframe Project mean vulnerability functions.
FIG. 6

Seismic hazard function for a Los Angeles site.

Comparing *EAL* by methods 1 and 2 for 15 sample buildings.

|                                         | Don't buy | As-is  | Insure | Retrofit |
|-----------------------------------------|-----------|--------|--------|----------|
| Mean after-tax PV of income, $E[I]$     | $0.0      | $39.0  | $31.5  | $39.0    |
| Purchase price $C_0$                    | 0.0       | 10.0   | 10.0   | 12.4     |
| $EAL$                                   | 0.0       | 0.054  | 0.033  | 0.043    |
| After-tax PV of earthquake loss $E[L]$  | 0.0       | 1.6    | 1.0    | 1.3      |
| Variance of income $Var[I]$             | 0.0       | 1521.0 | 1521.0 | 1521.0   |
| Variance of earthquake loss, $Var[L]$   | 0.0       | 0.9    | 0.7    | 0.7      |
| Certainty equivalent $CE$               | 0.0       | 19.8   | 12.9   | 17.7     |

Certainty equivalent of four investment alternatives. All FIG.s in $M.

FIG. 9

METHOD, COMPUTER PROGRAM PRODUCT, AND SYSTEM FOR RISK MANAGEMENT

PRIORITY CLAIM

This application is a non-provisional application, claiming the benefit of priority to provisional application No. 60/475,744, filed in the United States on Jun. 4, 2003, titled, "A Process for Estimating Expected Annualized Loss to a Facility as a Result of Earthquakes, using a Scenario Loss Estimate and a Site Hazard Factor."

BACKGROUND OF THE INVENTION (1) Technical Field

The present invention relates to risk management. More specifically, the present invention relates to a method, computer program product, and system for estimating an expected annualized loss for use in risk management, such as in seismic risk management.

(2) Description of Related Art

The field of seismic risk management has been gradually developing over the past few decades, increasingly enabled by technological advances in software and driven by a need for more informed property ownership decisions.

Seismic risk enters into several important real estate decision-making processes, such as the purchase of investment property, performance-based design of new structures, seismic rehabilitation of existing buildings, and decisions regarding the purchase of earthquake insurance. In such situations, important factors include, for example, who the decision-makers are, how they make decisions, what aspects of seismic risk most concern them, and the length of their planning horizon.

Economic seismic risk to large commercial properties with commercial mortgages is assessed every time the property changes hands, typically on the order of every five to ten years. By contrast, a building is designed and built only once. Thus, the most common opportunities for market forces to bring about seismic-risk mitigation for commercial properties are at times of sale. Anecdotal evidence suggests that these are mostly missed opportunities, as risk is typically not mitigated, even in more vulnerable buildings.

This can be partly explained by considering the context in which seismic assessments are performed. During virtually every sale of an existing commercial building, the buyer assesses the building's investment value using a financial analysis that considers revenues and expenses, rent roll, market leasing, physical condition, and other property information. The investor makes his or her bidding decision based on projected income and expenses, using one or more of the economic performance metrics of net present value, net operating income, cash flow, internal rate of return, and capitalization rate.

The input to this financial analysis is typically provided by a real estate broker representing the seller, whose FIG.s the investor checks and modifies during a due-diligence study. Many of the inputs are known values, such as the quantity of leases, duration, and income from current leases. However, many other values are uncertain. Vacancy rates, market rents, and other important parameters fluctuate significantly and unpredictably, leading to substantial uncertainty in the future economic performance of a property. In the face of these uncertainties, the bidder usually estimates investment value using best-estimate inputs and then again with deterministic sensitivity studies to probe conditions that would lead to poor performance (higher future vacancy rates, for example). The future cost to repair earthquake damage is not one of the parameters the bidder uses in the financial analysis. This is important because seismic risk is not a market quantity.

The real estate market is not wholly without forces to influence seismic-risk mitigation. The due-diligence study typically includes an engineering assessment of the condition of the property, which itself typically includes an estimate of the earthquake probable maximum loss (PML). PML is by far the dominant earthquake risk parameter in financial circles.

The earthquake PML has no standard quantitative definition. Most working definitions involve the level of loss associated with a large, rare event. One definition is that PML is the $90^{th}$ percentile of loss given the occurrence of what building codes until recently called the design basis earthquake (DBE). The DBE is an event producing a shaking intensity with 10% exceedance probability in 50 years. Colloquially (and inexactly), this is an upper-bound loss given the 500-year earthquake. More accurately, assuming Poisson arrivals of earthquakes, this shaking level has a mean occurrence rate of $0.00211 \text{ yr}^{-1}$ and a mean recurrence time of 475 years. Because this PML is the $90^{th}$ percentile loss given this level of shaking, the PML-level loss can have a much longer mean recurrence time.

Commercial lenders often use PML to help decide whether to underwrite a mortgage. It is common, for example, for a commercial lender to refuse to underwrite a mortgage if the PML exceeds 20% to 30% of the replacement cost of the building, unless the buyer purchases earthquake insurance, a costly requirement that often causes the investor to decide against bidding. Once the PML hurdle is passed, the bidder usually proceeds to ignore seismic risk, for at least the following:

1. Irrelevant planning period. Investors plan on the order of 5 years, making loss corresponding to shaking intensity with a 500-year recurrence time largely irrelevant, too rare even for consideration in a sensitivity study.
2. Incompatibility with financial analysis. PML is a scenario value, not an ongoing cost that can be reflected in a cashflow analysis.
3. Custom. Investors are not required by custom or regulation to include seismic risk in the financial analysis.

Lacking any measure of economic risk beyond PML, the bidder has no basis for assessing how the seismic risk of a building should influence the purchase price or for judging whether seismic risk mitigation might be worth exploring. Faced with a high PML, the bidder might increase the discount rate used in the financial analysis to reduce the present value of the future net income stream, but no analysis aids the adjustment.

Another common term in earthquake loss estimation, namely expected annualized loss (EAL), measures the average yearly amount of loss when one accounts for the frequency and severity of various levels of loss. For comparison purposes, the current method to calculate EAL is discussed below as Method 1. If a user knows the EAL for a given property, they could include it as an operating expense in the financial analysis. However, current methods available to calculate EAL are time-consuming and cost prohibitive. Thus, a need exists for an accurate, effective, and affordable method to calculate EAL.

SUMMARY OF THE INVENTION

The present invention relates to risk management. More specifically, the present invention relates to a method for estimating an expected loss for use in risk management. The method comprises an act of calculating a statistic of loss per unit time, the statistic being a product of a site loss parameter and a loss given a loss-basis event.

In the act of calculating a statistic of loss per unit time, the site loss parameter is a loss selected from a group consisting of a casualty and economic loss, creating a site casualty parameter and a site economic parameter.

Furthermore, in the act of calculating a statistic loss per unit time, the loss-basis event is a loss selected from a group consisting of a casualty and economic loss, creating a casualty-basis event and an economic-basis event.

In another aspect, in the act of calculating a statistic loss per unit time, the loss-basis peril is a peril selected from a group consisting of earthquakes, floods, wind, or blast.

In yet another aspect, in the act of calculating a statistic loss per unit time, the statistic loss per unit time is an annualized expected loss (EAL), the EAL being an average repair cost per year resulting from future seismic activity. Additionally, the EAL is further calculated according to the following, $$EAL = H \cdot PFL,$$

wherein H represents the site economic hazard parameter;
wherein PFL represents a probable frequent loss, defined as the mean loss conditioned on an occurrence of $S_{EBE}$; and
where $S_{EBE}$ represents a seismic intensity associated with an economic-basis-earthquake (EBE), whereby through calculating the EAL, the EAL can be used to manage seismic risk.

In another aspect, the method further comprises an act of defining an economic-basis-earthquake (EBE), the EBE being an event that produces a site shaking with a stated exceedance probability during a stated number of years. The stated exceedance probability is approximately 10% and the stated number of years is approximately 5 years.

In yet another aspect, H is calculated according to the following, $$H = \frac{G_{NZ}}{\ln(G_{NZ}/G_{EBE})},$$

wherein $G_{NZ}$ represents a mean annual exceedance frequency of $S_{NZ}$, $S_{NZ}$ represents a seismic intensity associated with initiation of loss (the smallest value of site intensity that will produce nonnegligible loss), and $G_{EBE}$ represents a mean annual exceedance frequency of $S_{EBE}$,
wherein $G_{EBE}$ is calculated according to the following, $$G_{EBE} = -\ln(1 - P_{EBE})/t_{EBE},$$

wherein $P_{EBE}$ represents a probability of exceeding $S_{EBE}$ in time $t_{EBE}$, and $t_{EBE}$ represents a planning period associated with EBE.

In an additional aspect, $S_{EBE}$ is calculated according to the following, $$S_{EBE} = G^{-1}(G_{EBE}),$$

wherein $G(s)$ represents the mean annual exceedance frequency of shaking intensity s, and $G^{-1}(g)$ represents the inverse of $G(s)$ evaluated at a particular value g.

In another aspect, the method further comprises an act of estimating the PFL. The PFL represents a point on a mean seismic vulnerability function (a relationship between mean loss and shaking intensity) for a frequent shaking intensity. In the act of estimating PFL, PFL is estimated from a method selected from a group consisting of employing assembly-based vulnerability at intensity level $S_{EBE}$, employing linear assembly-based vulnerability at intensity level $S_{EBE}$, and employing expert opinion.

Additionally, employing assembly-based vulnerability at intensity level $S_{EBE}$ further comprises acts of selecting a ground-motion time history and creating a stochastic structural model; performing a non-linear time history structural analysis using the ground-motion time history and the structural model to determine structural response; assessing probabilistic damage via component fragility functions evaluated using results from the structural response; assessing loss via probabilistic construction cost-estimation and results of the assessed probabilistic damage; and repeating steps of selecting the ground-motion time history, creating the stochastic structural model, performing the non-linear structural analysis, assessing the probabilistic damage, assessing the loss to estimate a probability distribution of loss at $S_{EBE}$, and calculating the loss statistic PFL.

In another aspect, employing linear assembly-based vulnerability at intensity level $S_{EBE}$ further comprises acts of defining a facility using one or more facility-defining parameters, the facility-defining parameters being selected from a group consisting of location, including latitude and longitude, site soils, substructure, and structural and nonstructural components; using the defined facility to create an inventory of damageable assemblies and identifying each assembly's engineering demand parameter (EDP); determining the $S_{EBE}$; analyzing a structure by calculating a structural response to which each damageable assembly is subjected; and analyzing damage and loss estimates to calculate an expected total cost to repair the structure according to the following, $$PFL = (1 + \overline{C}_{OP}) \sum_{k=1}^{N} \overline{y}_k(\overline{x}_k),$$

where subscript k refers to particular assemblies, N refers to a number of damageable assemblies, $\overline{y}_k(\overline{x}_k)$ is referred to as a mean assembly vulnerability function, and refers to the mean repair cost per assembly when the assembly is subjected to $EDP = x_k$, $\overline{y}_k$ refers to a mean repair cost to assembly k, $x_k$ refers to an engineering demand parameter for assembly k) and $\overline{C}_{OP}$ refers to contractor's mean overhead-and-profit factor.

In the act of determining $S_{EBE}$, $S_{EBE}$ is determined using a damped elastic spectral acceleration response at the structure's estimated small-amplitude fundamental period of vibration, $S_a(T_1)$, and is adjusted to account for site classification.

In another aspect, the method further comprises an act of calculating a certainty equivalent with the EAL, the certainty equivalent calculated according to the following, $$CE = E[I] - C_0 - E[L] - \frac{\text{Var}[I] + \text{Var}[L]}{2r} - rR,$$

wherein $E[I]$ represents an expected present value of a future net income stream, $C_0$ represents a purchase price, $E[L]$ represents an expected present value of future seismic losses, $\text{Var}[I]$ represents a variance of the present value of the net income stream and is considered a measure of market risk, $\text{Var}[L]$ represents a variance of a present value of future seismic losses, r represents risk tolerance, and R represents remainder terms associated with higher-order moments of income and seismic loss.

As can be appreciated by one in the art, the present invention is not limited to a method, but can also be incorporated into other aspects such as a data processing system and a computer program product. Other aspects can be configured to be used on a personal computer, to be Internet-accessible, and to perform all of the acts of the method described herein.

BRIEF DESCRIPTION OF THE DRAWINGS

The objects, features and advantages of the present invention will be apparent from the following detailed descriptions of the preferred aspect of the invention in conjunction with reference to the following drawings where:

FIG. 1a is a graph illustrating a mean assembly vulnerability function for a drywall finish;

FIG. 1b is a graph illustrating a mean assembly vulnerability function for a drywall partition;

FIG. 1c is a graph illustrating a mean assembly vulnerability function for a non-ductile reinforced concrete beam-column;

FIG. 1d is a graph illustrating mean assembly vulnerability functions for both stucco and glazing;

FIG. 2 is a table illustrating a summary of assembly fragility parameters and cost distributions;

FIG. 6a is a graph illustrating seismic vulnerability functions for variants of a small house;

FIG. 6b is a graph illustrating seismic vulnerability functions for variants of a large house;

FIG. 6c is a graph illustrating seismic vulnerability functions for variants of a three-unit townhouse;

FIG. 6d is a graph illustrating seismic vulnerability functions for variants of an apartment building;

FIG. 9 is a table illustrating certainty equivalents of four investment alternatives;

DETAILED DESCRIPTION

Figure 3A:
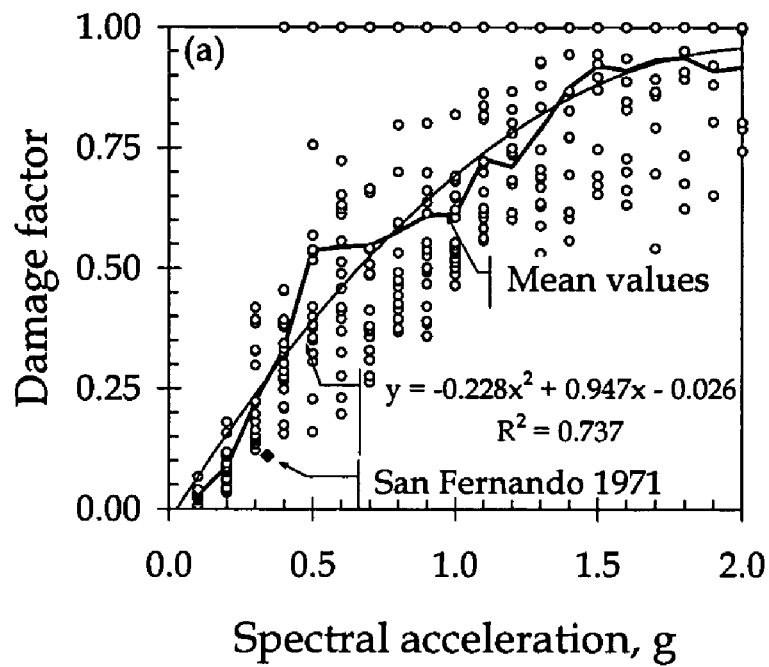
FIG. 3a is a graph illustrating a mean seismic vulnerability function.

The present invention relates to risk management. More specifically, the present invention relates to a method, computer program product and system for estimating an expected annualized loss for use in risk management, such as in seismic risk management.

The following description, taken in conjunction with the referenced drawings, is presented to enable one of ordinary skill in the art to make and use the invention and to incorporate it in the context of particular applications. Various modifications, as well as a variety of uses in different applications, will be readily apparent to those skilled in the art, and the general principles defined herein, may be applied to a wide range of aspects. Thus, the present invention is not intended to be limited to the aspects presented, but is to be accorded the widest scope consistent with the principles and novel features disclosed herein. Furthermore, it should be noted that unless explicitly stated otherwise, the FIG.s included herein are illustrated diagrammatically and without any specific scale, as they are provided as qualitative illustrations of the concept of the present invention.

In order to provide a working frame of reference, first a list of abbreviations is provided as a quick reference provided for the reader. Second, a glossary of terms used in the description and claims is provided. Next, a discussion of various principal aspects of the present invention is provided. Fourth, an introduction is presented to provide the reader with a general understanding of the present invention. Fifth, a discussion is provided to give an understanding of the specific details of the present invention. Finally, a conclusion is provided to summarize key aspects of the present invention.

(1) Abbreviations

| | |
|---|---|
| ABV | assembly-based vulnerability; |
| $c_d$ | mean cost to repair one unit of an assembly from damage state d; |
| $C_0$ | initial cost; |
| CE | certainty equivalent; |
| $C_{OP}$ | factor applied to total direct construction cost to account for contractor overhead and profit; |
| d | particular value of damage state; |
| D | uncertain damage state; |
| DBE | design-basis earthquake; |
| EAL | expected annualized loss, units in money/time (e.g. dollars/year); |
| EBE | economic-basis earthquake; |
| EDP | engineering demand parameter; |
| FEMA | Federal Emergency Management Agency; |
| $F_X(x)$ | cumulative distribution function of uncertain variable X evaluated at x; |
| $G(s)$ | mean annual frequency of exceeding s, units in 1/time; |
| $G_{EBE}$ | mean annual exceedance frequency of $S_{EBE}$, units in 1/time; |
| $G_{NZ}$ | mean annual exceedance frequency of $S_{NZ}$, units in 1/time; |
| $G_U$ | mean annual exceedance frequency of $S_U$, units in 1/time; |
| H | hazard coefficient, units in 1/time; |
| h | story height; |
| i | discount rate; |
| I | income; |
| L | loss; |
| LABV | linear assembly-based vulnerability; |
| m | slope of $\ln(G(s))$; |

-continued

| | |
|---|---|
| $N_D$ | number of possible damage states; |
| NIBS | National Institute of Building Sciences; |
| PFL | probable frequent loss, units in money; |
| PML | probable maximum loss, units in money; |
| r | risk tolerance; |
| s | seismic intensity, units vary depending on selection of s. As an illustration, units for the damped elastic spectral acceleration are in distance/time$^2$ (e.g., ft/sec$^2$); |
| $S_\alpha$ | spectral acceleration; |
| $S_{EBE}$ | seismic intensity associated with the economic-basis earthquake; |
| $S_{NZ}$ | seismic intensity associated with initiation of loss; |
| $S_U$ | seismic intensity associated with saturation of loss; |
| $T_1$ | small-amplitude fundamental period of vibration; |
| u(x) | utility function evaluated at x; |
| V | value exposed to loss, units in units of money; |
| v(s) | absolute value of the first derivative of G(s); |
| $\bar{y}(s)$ | mean seismic vulnerability function evaluated at s; |
| $y_U$ | upper-bound loss; |
| Γ | modal participation factor; |
| $\phi_1$ | fundamental mode-shape vector; and |
| $\omega_1$ | fundamental frequency of vibration. |

(2) Glossary

The purpose of this glossary is to provide a working frame of reference regarding some of the terms used in the description and claims. The glossary is intended to provide the reader with a general understanding of various terms as they are used in this disclosure, and is not intended to limit the scope of these terms. Rather, the scope of the terms is intended to be construed with reference to this disclosure as a whole and with respect to the claims below. The definitions provided should not be considered limiting to the extent that the terms are known in the art.

Assembly—The term "assembly" refers to a collection of one or more basic building components, assembled in place, and defined according to a standard taxonomic system that is based here on the assembly-numbering system of RS Means, located at 63 Smiths Lane, P.O. Box 800, Kingston, Mass., 02364, United States, extended to account for details of seismic resistance.

Economic-Basis Earthquake—The term "economic-basis earthquake" refers to an event that produces a site shaking with a stated exceedance probability during a stated number of years. As a non-limiting example, the stated exceedance probability is approximately 10% and the stated number of years is approximately 5 years.

Expected Annualized Loss—The term "expected annualized loss" (EAL) refers to an average yearly amount of loss when accounting for the frequency and severity of various levels of loss.

Facility—The term "facility" refers to a building, bridge, or other system comprising a combination of civil, structural, architectural, mechanical, electrical, and/or plumbing components, and can also include furnishings, fixtures, and equipment.

Means—The term "means" as used with respect to this invention generally indicates a set of operations to be performed on a computer, and may represent pieces of a whole program or individual, separable, software modules. Non-limiting examples of "means" include computer program code (source or object code) and "hard-coded" electronics (i.e. computer operations coded into a computer chip). The "means" may be stored in the memory of a computer or on a computer readable medium such as a floppy disk, a CD-ROM, and a flash drive.

Probable Frequent Loss—The term "probable frequent loss" (PFL) refers to the expected value of loss conditioned on the occurrence of an economic-basis earthquake.

Probable Maximum Loss—The term "probable maximum loss" (PML) commonly refers to the mean loss or the 90$^{th}$ percentile of loss given the occurrence of what building codes until recently called the design basis earthquake.

Structure—The term "structure" refers to (1) a system of components in a facility that provide the facility's resistance to loads and deformations, e.g., the facility's beams, columns, floor diaphragms, shearwalls, braces, and connections; or (2) synonym for facility.

(3) Principal Aspects

The present invention has three "principal" aspects. The first is a method for seismic risk management where the method typically operates on a computer system. The second principal aspect is a system for seismic risk management, typically in the form of software and/or manual operations, operated using a data processing system (computer). The third principal aspect is a computer program product. The computer program product generally represents computer-readable code (either source or object code) stored on a computer-readable medium such as an optical storage device, e.g., a compact disc (CD) or digital versatile disc (DVD), or a magnetic storage device such as a floppy disk or magnetic tape. Other, non-limiting examples of computer readable media include hard disks, read only memory (ROM), and flash-type memories. These aspects will be described in more detail below.

(4) Introduction

The present invention includes a method, computer program product, and system for risk management. Although for illustrative purposes the invention described herein largely uses language discussing seismic events and seismic risks, the invention is not limited thereto. The method of the present invention can be applied to risk management for structures exposed to any extraordinary event, non-limiting examples of which include a seismic event such as an earthquake, floods, wind, and blast pressure.

Most seismic risk assessments for economic decision-making relating to commercial buildings are associated with the effects of an earthquake with a 500-year return period, using a risk metric called probable maximum loss (PML). While reasonable to use for life-safety assessments, 500-year events are poor indicators of economic performance, because decision-makers tend to view such long time periods as irrelevant and because PML provides little useful information for standard financial analysis associated with property investment and development. The present invention introduces an analogous measure, the probable frequent loss (PFL), defined as a central-value measure (e.g. mean, median, mode) of loss resulting from an economic-basis earthquake. As a non-limiting example, the PFL may be defined as the mean loss resulting from a shaking level with a 10% exceedance probability in 5 years (an approximately 50-year return period). It is shown that PFL can be used to approximate the expected annualized loss (EAL), as EAL is approximately proportional to PFL through a hazard parameter H, the calculation for which is presented here. The two measures, PFL and EAL, offer at least three advantages for economic performance evaluation over PML: (1) PFL employs a time period consistent with that of building owners; (2) both PFL and EAL can be used directly in a property-investment financial analysis;

and (3) PFL-level shaking is more likely to be accurately modeled by linear structural analysis. The estimation of EAL using PFL and H is illustrated for a number of buildings. Finally, a simple but formal decision-analysis framework for risk-management decision-making for real estate investments in seismic regions is presented to illustrate how EAL can be used while still accounting for risk aversion.

(5) Description of Specific Embodiments

The present invention discloses a method for calculating a statistic of loss per unit time, the statistic being a product of a site loss parameter and a loss given a loss-basis event. The site loss parameter may be any loss associated with a structure and the loss resulting from the loss-basis event may be any loss associated with an event, non-limiting examples of which include casualty and economic losses. Additionally, the peril associated with the loss-basis event may be any peril that can cause a loss to a structure, non-limiting examples of which include an earthquake, a flood, wind, and blast pressure.

The statistic of loss per unit time is any calculable loss per unit time, a non-limiting example of which includes an annualized expected loss (EAL). The EAL is an average repair cost per year resulting from a future loss-basis event, such as from future seismic activity. Depending on a desired result, the central value used in the EAL may be the mean, the mode, or the median.

For illustrative purposes, three ways to estimate EAL are presented, from an accurate, but information-intensive approach, (Method 1) to two successively simpler ones (Methods 2 and 3). Method 1 involves evaluation of the seismic vulnerability function for a building and seismic hazard function for a site, and integrating their product to calculate EAL. Method 2 takes advantage of the fact that a scenario loss estimate can be shown to be proportional to EAL, and uses the constant of proportionality to calculate EAL from a scenario loss resulting from an approximately 50-year shaking intensity. Method 3 uses the constant of proportionality as well, and further simplifies the analysis of the 50-year loss using linear spectral analysis. As illustrated herein, these three methods are compared using a number of realistic sample facilities to show that the effort involved in seismic risk analysis can be substantially reduced through reasonable simplifications.

A. EAL Method 1: Integration of Seismic Vulnerability and Hazard

Assuming independence of intensity and of losses between events, EAL can be calculated as $$EAL = V \int_{S=0}^{\infty} y(s)v(s)\,ds,  \quad (1)$$

where V denotes value exposed to loss (e.g., replacement cost of the building), s refers to some seismic intensity measure, y(s) is the mean seismic vulnerability function (defined here as the average level of loss as a fraction of V given the occurrence of s), and v(s) is the average annual frequency of experiencing shaking intensity s. Note that $$v(s) = \left| \frac{dG(s)}{ds} \right|, \quad (2)$$

where G(s) denotes the mean annual frequency of a site experiencing intensity of s or greater, referred to here as the site shaking hazard function.

It is convenient to think of shaking intensity in terms of some familiar measure such as a 5%-damped elastic spectral acceleration response at a facility's small-amplitude fundamental period, $S_a(T_1)$, but other intensity measures are also valid.

In most practical situations, y(s) and G(s) would be evaluated at a set of n+1 discrete intensity values $s_0, s_1, \ldots s_n$. These values are denoted by $y_0, y_1, \ldots y_n$, and $G_0, G_1, \ldots G_n$, respectively. Assuming that G(s) varies exponentially between the discrete values of s, i.e., $$G(s) = G_{i-1}\exp(m_i(s - s_{i-1})) \text{ for } s_{i-1} \leq s < s_i, \quad (3)$$

where $m_i$ is a negative constant. Equations 2 and 3 then imply for $s_{i-1} \leq s < s_i$, and $$v(s) = -\frac{dG}{ds}\bigg|_s, \text{ with} \quad (4)$$
$$= -m_i G(s)$$

$m_i$ is estimated as $$m_i = \frac{\ln(G_i/G_{i-1})}{\Delta s_i} \quad i = 1, 2, \ldots n, \quad (5)$$

where $$\Delta s_i = s_i - s_{i-1}\, i=1, 2, \ldots n, \quad (6)$$

Assuming that the seismic vulnerability function varies linearly between values of s, i.e., $$y(s) = y_{i-1} + \frac{\Delta y_i}{\Delta s_i}(s - s_{i-1}) \text{ for } s_{i-1} < s < s_i, \quad (7)$$

where $$\Delta y_i = y_i - y_{i-1}\, i=1, 2, \ldots n. \quad (8)$$

Then EAL is given by $$EAL = V\sum_{i=1}^{n}\left(\int_0^{\Delta s_i}\left(y_{i-1} + \frac{\Delta y_i}{\Delta s_i}\tau\right)(-m_i G_{i-1}\exp(m,\tau))\,d\tau\right) + R \quad (9)$$

$$= V\sum_{i=1}^{n}\left(-y_{i-1}G_{i-1}\exp(m_i\tau)\big|_{\tau=0}^{\Delta s_i} - \frac{\Delta y_i}{\Delta s_i}G_{i-1}\left(\exp(m_i\tau)\left(\tau - \frac{1}{m_i}\right)\right)\bigg|_{\tau=0}^{\Delta s_i}\right) + R$$

$$= V\sum_{i=1}^{n}\left(y_{i-1}G_{i-1}(1 - \exp(m_i\Delta s_i)) - \frac{\Delta y_i}{\Delta s_i}G_{i-1}\left(\exp(m_i\Delta s_i)\left(\Delta s_i - \frac{1}{m_i}\right) + \frac{1}{m_i}\right)\right) + R,$$

where R is a remainder term for values of $s > s_n$, and has an upper bound of $VG(s_n)$ if $y(s) \leq 1$, and where $$\tau = s - s_{i-1}\, s_{i-1} < s < s_i. \quad (10)$$

Calculating EAL by Equation 9, as shown in Method 1, is not easy to perform. For example, to determine G(s) requires an understanding of the local seismic environment, such as the distance to nearby earthquake faults, the expected rate at which they produce earthquakes of various magnitudes, and the attenuation relationships that give shaking intensity s as a function of magnitude, distance, and other geological parameters. Although this information is increasingly available, to determine y(s) requires either large quantities of empirical post-earthquake survey data (which, for various reasons, do not exist in reliable form), or laborious engineering damage and loss analyses requiring a skill set beyond that of most engineers, or the exercise of expert opinion, which carries with it the stigma of unverifiability.

Software such as HAZUS by the Federal Emergency Management Agency (FEMA), located at 500 C Street, SW Washington, D.C. 20472, USQUAKE by EQECAT, located at 1111 Broadway 10$^{th}$ Floor, Oakland, Calif. 94607, and ST-RISK by Risk Engineering, Inc., located at 4155 Darley Avenue, Suite A, Boulder, Colo. 80305, contain pre-evaluated vulnerability and hazard information and can calculate EAL. These programs are widely employed and produce useful information relatively quickly and inexpensively. They treat a wide variety of structure types, and some offer the ability to account for several configurations and other characteristics that affect seismic performance. However, the available software relies to a significant extent on expert opinion and does not perform structural analysis on a building-specific basis. They are thus insensitive to many of the details that cause performance differences between distinct buildings of the same building type. In order to avoid reliance on expert opinion, to account for details at the level of standard practice of design, and keep the analysis relatively simple, the present invention was designed to create a simplified loss-estimation procedure.

A method to assess building vulnerability is essential for loss estimation. A recently developed method called assembly-based vulnerability (ABV) provides a rigorous probabilistic framework for assessing building vulnerability. ABV considers detailed structural and nonstructural characteristics of the building and accounts for uncertainties in the ground motion, structural features, damageability of structural and nonstructural components, and unit repair costs, to provide a probabilistic description of earthquake response, damage, and loss conditional on shaking intensity. It extends previous work that disaggregates a building into categories of components, of which damage can be evaluated as a function of the structural response, and of which repair cost can be calculated using construction-cost-estimation techniques. ABV uses a more-detailed category system than previous methods to produce vulnerability functions that are more building-specific, among other differences.

Briefly, ABV is a simulation procedure that involves selection of ground-motion time histories, creation of a stochastic structural model, performance of non-linear time-history structural analyses to determine structural response, assessment of probabilistic damage via component fragility functions, assessment of loss via probabilistic construction cost-estimation, and repetition many times to estimate the probability distribution of loss at various levels of intensity. ABV has proven to be a useful research tool, used to evaluate seismic risk and to perform benefit-cost analysis of seismic-risk mitigation for steel-frame, woodframe and concrete buildings, and to explore major contributors to the uncertainty in economic seismic risk. However, ABV is difficult to use in professional practice for estimating y(s) because it requires special skills and software to create the stochastic non-linear structural model, to perform the hundreds of structural analyses, to model the component damageability, and to calculate repair costs. ABV is not particularly computationally costly. Once set up, the structural analyses for a typical building can be performed overnight in batch mode, and the subsequent damage and loss analyses can be performed in an hour or so. In each of the examples presented here, the structural analyses took on the order of 8-12 hours on a common desktop computer. It is the setup that is time-consuming, principally the creation of the structural model.

Some simplifications are possible that can make ABV a more realistic alternative for practitioners to calculate EAL, and to produce a probability-based scenario risk measure that is more meaningful to investors than PML. Two keys to these simplifications, to be discussed in later sections, are first that EAL appears to be dominated by nonstructural damage at moderate levels of shaking, where structural behavior is probably well approximated by linear dynamics, and second that EAL can be approximated by the product of a scenario mean-loss level and a site economic hazard coefficient, suggesting that one scenario loss analysis could produce a good estimate of EAL.

B. EAL Method 2: Using Probable Frequent Loss (PFL)

Suppose one estimates the mean loss associated with the shaking intensity that has 10% exceedance probability in 5 years, which corresponds to a return period of approximately 50 years (more accurately, 47.5 years, assuming Poisson arrivals of earthquakes). For convenience, let an earthquake with this intensity be referred to as the economic-basis earthquake (EBE). Let the mean loss given the EBE be referred to as the probable frequent loss (PFL), in contrast with the PML. There is good reason to define the EBE this way. To test the life-safety of a structural design, structural engineers have historically considered upper-bound shaking (10% exceedance probability) during the design life of the building (50 years), referring to this level of shaking as the design-basis earthquake (DBE). If one wants to examine an upper-bound event during an owner's planning period, then it is consistent to use the same exceedance probability (10%) during the owner's planning period (i.e. 5 years).

A shaking intensity with a 50% exceedance probability in 50 years, a scenario shaking level treated for example by the Federal Emergency Management Agency (FEMA), is not desirable because it is ineffective for risk communication. EBE is defined for its meaning to the investor, for whom 50 years is too long a planning period and a 50% exceedance probability does not bespeak an upper-bound intensity. Our definition of EBE more simply and directly addresses the concerns of the investor.

The shaking intensity for the EBE is denoted by $S_{EBE}$, which again can be measured in terms of $S_a$ or by some other convenient intensity scale. There is an intensity level associated with the initiation of damage, the intensity being denoted by $S_{NZ}$ (NZ referring to non-zero damage). Additionally, there is an intensity level, $S_U \geq S_{EBE}$ at which the vulnerability function reaches an upper bound, $y_U$, such that for $s \geq S_U$, $y(s)=y_U$. In some cases the upper-bound damage factor might be unity, i.e., one would not pay repair costs in excess of the replacement cost. The mean annual frequencies of a site exceeding $S_{NZ}$, $S_{EBE}$, and $S_U$, are denoted by $G_{NZ}$, $G_{EBE}$, and $G_U$, respectively. For illustrative purposes, a simplified method for computing EAL in which seismic vulnerability and hazard functions are approximated by:

$$y(s) = 0 \quad s < S_{NZ} \quad (11)$$
$$= a(s - S_{NZ}) \quad S_{NZ} \leq s \leq S_U,$$
$$= y_U \quad S_U \leq s$$

$$G(s) = G_{NZ} \exp(m(s - S_{NZ})), \quad (12)$$

where a and m are constants. In case studies presented later, the quality of the approximations in Equations 11 and 12 are examined, which reflect a special 10 case of Equation 9 with n=1. Here, $s_0 = S_{NZ}$, $s_1 = S_U$, $G_0 = G_{NZ}$, $G_1 = G_U$, $y_0 = 0$, and $y_1 = y_U$. Since $y(S_{EBE}) = PFL/V$ and $G(S_{EBE}) = G_{EBE}$, $$a = \frac{PFL}{V(S_{EBE} - S_{NZ})}, \quad (13)$$

$$m = \frac{-\ln(G_{NZ}/G_{EBE})}{S_{EBE} - S_{NZ}}, \text{ and} \quad (14)$$

$$S_U = S_{NZ} + \frac{y_U}{a} \quad (15)$$
$$= S_{NZ} + \frac{y_U V(S_{EBE} - S_{NZ})}{PFL}.$$

EAL can now be evaluated. Defining $\tau \equiv s - S_{NZ}$ and $\sigma \equiv s - S_U$, and recalling that m<0, $$EAL = V\left(\int_{s=S_{NZ}}^{\infty} a(s - S_{NZ})(-mG(s))\,ds - \int_{s=S_U}^{\infty} (a(s - S_{NZ}) - y_U)(-mG(s))\,ds\right), \quad (16)$$

$$EAL = V\left(\int_0^{\infty} (a\tau)(-mG_{NZ}\exp(m\tau))\,d\tau - \int_0^{\infty} (a\sigma)(-mG_U\exp(m\sigma))\,d\sigma\right) \quad (17)$$
$$= Va\left(-(G_{NZ} - G_U)\left(\exp(m\tau)\left(\tau - \frac{1}{m}\right)\right)\Big|_{\tau=0}^{\infty}\right)$$
$$= -Va\frac{(G_{NZ} - G_U)}{m}$$
$$= \frac{PFL}{(S_{EBE} - S_{NZ})} \frac{(G_{NZ} - G_U)(S_{EBE} - S_{NZ})}{\ln(G_{NZ}/G_{EBE})}$$
$$= \frac{(G_{NZ} - G_U)}{\ln(G_{NZ}/G_{EBE})} PFL$$

If $S_U$ is significantly greater than $S_{NZ}$, as expected, then $G_U$ will be small compared with $G_{NZ}$, which leads to:

$$EAL \approx \frac{G_{NZ}}{\ln(G_{NZ}/G_{EBE})} PFL. \quad (18)$$

Defining $$H \equiv \frac{G_{NZ}}{\ln(G_{NZ}/G_{EBE})}, \quad (19)$$

leads to the final form:

$$EAL \approx H \cdot PFL, \quad (20)$$

where H is referred to as the site economic hazard coefficient. It contains only hazard variables, so it can be mapped as a scalar for a given fundamental period, soil condition, and $S_{NZ}$. Its units are $yr^{-1}$. It is a simple matter to calculate the expected present value of future earthquake losses using EAL, given the discount rate (denoted by i), and the planning period (denoted by t):

$$PV = EAL \frac{(1 - e^{-it})}{i} \quad (21)$$
$$= H \cdot PFL \frac{(1 - e^{-it})}{i}.$$

Equations 20 and 21 still require an estimate of PFL. One method for estimating PFL is to perform an ABV analysis at the intensity level $S_{EBE}$, including selection of ground-motion time histories, non-linear time-history structural analysis, damage analysis, loss analysis, and simulation to account for uncertainties in ground motion, mass, damping, force-deformation behavior, component capacity, unit repair cost, and contractor overhead and profit. This approach is referred to as Method 2. Method 2 is simpler than Method 1 in that it does not require the evaluation of the seismic vulnerability function over the range of all possible shaking levels (i.e. as in Method 1). This would reduce the number of analyses by an order of magnitude, but would still require specialized skills and software. For example, the structural model would still need to be set up.

The loss analysis can be further simplified by taking advantage of the fact that at low levels of intensity, around $S_{EBE}$, the structural response of the facility might be adequately modeled using linear spectral analysis, thus avoiding the time-consuming construction of a non-linear structural model. Furthermore, only mean loss at $S_{EBE}$ is required, not the damage and not an estimate of uncertainty, allowing avoidance of aspects of ABV that are intended to quantify damage and uncertainty.

C. EAL Method 3: PFL and Linear ABV

A simplified approach called linear assembly-based vulnerability (LABV) can be used to calculate PFL and EAL. LABV includes the following four operations:

1. Facility definition. To define the facility an individual must know its location (latitude and longitude) and design, including site soils, substructure, structural and nonstructural components. The individual creates an inventory of the damageable assemblies and identifies the EDP—story drift ratio, member force, etc.—that would cause damage to each assembly.

2. Hazard analysis. The objective of this stage is to determine the $S_{EBE}$, that is, the intensity measure associated with 10% exceedance probability in 5 years. This might be parameterized via any of several intensity measures. For present purposes, let us use the 5%-damped elastic spectral acceleration response at the building's estimated small-amplitude fundamental period of vibration, $S_a(T_1)$. It can be calculated via software and adjusted to account for site classification such as by using $F_a$ or $F_v$, as appropriate, from the International Building Code (2000) provided by the International Code Council, located at 5203 Leesburg Pike, Suite 600, Falls Church, Va., 22041, United States.

3. Structural analysis. In this simplification, the structural response to which each damageable assembly is subjected is calculated considering the first-mode spectral response. The mode shape of a building at its small-amplitude fundamental period of vibration, $T_1$, is denoted by $\phi_1$. Let the modal excitation and modal mass for the first mode be denoted by $L_1$ and $M_1$, respectively. Each damageable assembly is assumed to be sensitive to an EDP, characteristic of that assembly type, with a value denoted by x, and which can be calculated as a function of $\phi_1$, $L_1$ and $M_1$. For example, considering one frame direction, the EDP for a segment of wallboard partition on the $m^{th}$ story would be the interstory drift along that wall line, estimated as $$x \approx \frac{S_{EBE}}{\omega_1^2} \left( \frac{\phi_{1(m+1)} - \phi_{1m}}{h_m} \right) \frac{L_1}{M_1}, \qquad (22)$$

where $\omega_1 = 2\pi/T_1$, $\phi_{1m}$ refers to the component of the fundamental mode shape at floor m, and $h_m$ refers to the height of story m.

4. Damage and loss analysis. It is assumed that after an assembly is subjected to a certain EDP, it will be in an uncertain damage state D, indexed by d=0, 1, 2, ... $N_D$, where d=0 indicates the undamaged state. It is assumed that the damage states can be sorted in increasing order, either because an assembly in damage state d=i+1 must have passed through damage state i already, or because the effort to restore an assembly from damage state d=i+1 necessarily restores it from damage state d=i. The threshold level of EDP causing an assembly to reach or exceed damage state d is uncertain, and is denoted by $X_d$, with a cumulative distribution function denoted by $F_{Xd}(x)$. The expected value of the cost to restore a damaged assembly from damage state d is denoted by $c_d$; it can be calculated by standard construction-cost estimation principles. Then, given the response x to which an assembly is subjected, the mean cost to repair the damageable assembly is $$\bar{y}(x) = \sum_{d=1}^{N_D} c_d p[D = d \mid EDP = x], \qquad (23)$$

where probability $$\begin{aligned} p[D = d \mid EDP = x] &= 1 - F_{X_1}(x) & d = 0 \\ &= F_{X_d}(x) - F_{X_{d+1}}(x) & 1 \le d < N_D \\ &= F_{X_{N_D}}(x) & d = N_D, \end{aligned} \qquad (24)$$

and where d=0 refers to the undamaged state.

Equation (23) is normalized by the replacement cost of the assembly, and is referred to as a component damage function. The present invention uses the non-normalized form to avoid considering the uncertain replacement cost of the component. That is, because construction contractors estimate repair effort directly in terms of labor hours and dollar costs, it is less prone to error to deal with $c_d$ directly, rather than as a fraction of another cost that must also be estimated. Taking all capacities from Beck, J. L., Porter, K. A., Shaikhutdinov, R. V., Au, S. K., Moroi, T., Tsukada, Y., and Masuda, M., 2002, "Impact of Seismic Risk on Lifetime Property Values, Final Report," Consortium of Universities for Research in Earthquake Engineering, Richmond, Calif., United States, as lognormally distributed, and using the median and logarithmic standard deviations shown there and in Porter, K. A., Beck, J. L., and Shaikhutdinov, R. V., 2002a, "Sensitivity of building loss estimates to major uncertain variables," Earthquake Spectra, 18 (4), 719-743, so $$F_X(x) = \Phi\left( \frac{\ln(x/\hat{x})}{\beta} \right), \qquad (25)$$

where $\hat{x}$ and $\beta$ vary by assembly type and damage state, and where $\Phi()$ denotes the cumulative standard normal distribution evaluated at the term in parentheses. Introducing subscript k to index particular assemblies, the expected total cost to repair the facility with N damageable assemblies is given by $$PFL = (1 + \bar{C}_{OP}) \sum_{k=1}^{N} \bar{y}_k(x_k), \qquad (26)$$

where $\bar{C}_{OP}$ refers to contractor's mean overhead-and-profit factor (typically 15% to 20%). Note $\bar{y}_k$ refers to a mean repair cost to assembly k, $x_k$ refers to an engineering demand parameter for assembly k (such as force or deformation that will depend on the assembly under consideration). Then EAL is calculated using Equation 20, as in Method 2.

For any assembly type, an individual can create a mean assembly vulnerability function by evaluating Equation 23 as a function of x. These mean assembly vulnerability functions can be archived and reused in later analyses. FIG. 1 shows mean assembly vulnerability functions for five damageable assemblies treated in Beck et al. (2002); see that reference for details. FIG. 1 (a) shows how Equation 23 produces the overall mean assembly vulnerability function for a 64-sf section of drywall finish, considering two damage states. FIG. 1 (b) shows similar results for drywall partition (partition includes the metal studs and drywall finish on one side); FIG. 1 (c) does so for non-ductile reinforced concrete beam-columns, and FIG. 1 (d) shows results for a type of window and a 64-segment of stucco exterior finish.

D. Case Studies

The following case studies are for illustrative purposes only. It can be appreciated by one skilled in the art that the method described herein can be applied to a wide variety of buildings, events, and situations.

Van Nuys hotel building: For illustrative purposes, results from Methods 1, 2, and 3 were compared using an actual high-rise hotel building located in Van Nuys, Calif., United States. The Van Nuys building is a seven-story, eight-by-three-bay, non-ductile reinforced-concrete moment-frame building, built in 1966. The Van Nuys building suffered damage in the 1971 San Fernando Earthquake and more extensive damage in the 1994 Northridge Earthquake, after which it was seismically upgraded. The building was analyzed in its pre-Northridge condition. See Beck et al. (2002) and Porter et al. (2002a) for details of the hazard model, structural model, component capacity distributions, and unit repair costs. Twenty levels of ground motion were examined: $S_a$(1.5 sec, 5%)=0.1 g, 0.2 g, ... 2.0 g. At each $S_a$ level, twenty ground-motion time histories were selected at random (within scaling limitations and other preferences) from 100, randomly pairing each with a sample of the stochastic structural model to perform a non-linear time-history structural analysis. In each of the 400 structural analyses, all structural, damage, and cost parameters varied according to prescribed probability distributions.

Masses were taken as perfectly correlated, normally distributed, with coefficient of variation equal to 0.10. Damping was taken as normally distributed with mean value of 5% and coefficient of variation equal to 0.40, as derived in Beck et al. (2002). Structural members were taken as having deterministic stiffnesses (including post-yield, unloading, etc.) but with yield and ultimate force and deformations that are perfectly correlated, normally distributed, with coefficient of variation of 0.08.

Component capacities were taken as lognormally distributed, with median (denoted by $\hat{x}$) and logarithmic standard deviation (denoted by $\beta$) summarized in the table of FIG. 2. As shown in FIG. 2, "Component capacity," refers to the uncertain value of the engineering demand parameter (EDP) at which a component exceeds a limit state. Limit states are defined in terms of the required repairs. Repair-cost distributions for individual damaged components (referred to here as unit-repair costs) were taken as lognormally distributed with median ($\hat{x}$) and logarithmic standard deviations ($\beta$) summarized in FIG. 2, with mean values estimated by a professional cost estimator. Contractor overhead and profit were taken as uniformly distributed between 15% and 20% of total direct costs (the sum of the costs to repair individual assemblies). Unit costs are in 2001 US dollars.

Two limitations of the model are noted. First, it did not capture collapse. Second, it employed uncoupled structural and damage analyses, i.e., damage was taken as conditionally independent of structural characteristics, conditioned on structural response. Recent research suggests that such an uncoupled analysis can underestimate uncertainty in repair costs, among other effects.

Figure 3B:
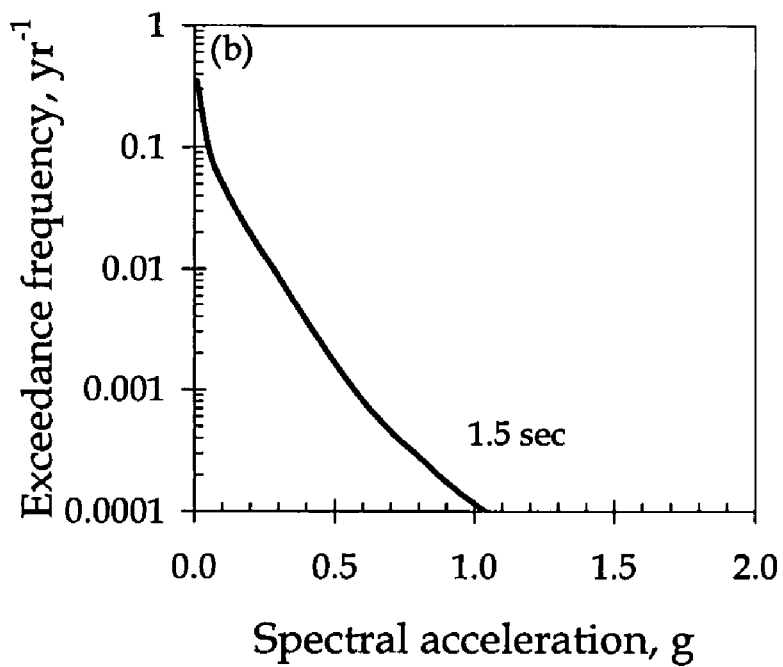
FIG. 3b is a graph illustrating a site hazard function for a building in Van Nuys, Calif., United States.

The resulting seismic vulnerability function is shown in FIG. 3 (*a*). The x-axis represents 5%-damped elastic spectral acceleration (denoted by $S_a$) at the building's small-amplitude fundamental period, 1.5 sec. The y-axis measures repair cost as a fraction of replacement cost. Each circle represents one loss simulation. The jagged line indicates mean damage factor at each $S_a$ level. The smooth curve is a polynomial fit to all of the data. Each simulation includes one non-linear time-history structural analysis using one ground-motion time history, one simulation of the (uncertain) mass, damping, and force-deformation characteristics of the building, one simulation of the damageability of each of 1,233 structural and nonstructural components, and one simulation of the unit-repair cost for each of 9 combinations of component type and damage state. The analysis included 20 simulations for each of 20 $S_a$ increments from 0.1 gravity unit (g) to 2.0 g. The 400 non-linear time-history structural analyses took approximately 12 hours of computer time on an ordinary desktop computer; the subsequent loss analysis took less than an hour. The most time-consuming portion of the analysis was creating the structural model.

The jaggedness of the mean-vulnerability curve shown in FIG. 3 (*a*) reflects three effects. First, beam and column repair costs begin to saturate near $S_a$=0.5 g for some simulations, possibly because of plastic hinges acting as structural fuses. Second, the damage factor begins to saturate near $S_a$=0.4 g. Repair cost was capped at the replacement cost of the building, and costs were estimated to reach or exceed this value in some simulations beginning at $S_a$=0.4 g. Third, with a residual coefficient of variation of damage factor as high as 0.50, an individual would expect to see some jaggedness in the mean vulnerability function from a Monte Carlo simulation with 20 samples per $S_a$ level.

FIG. 3 (*b*) provides the site seismic hazard function, denoted by $G(S_a)$ and defined as the mean annual exceedance rate of ground shaking as a function of $S_a$. The hazard was calculated at T=1.0 and 2.0 sec, with soil at the B-C boundary, and then interpolated in the log-frequency domain to calculate the hazard at T=1.5 sec, using International Building Code adjustments to account for soil condition. Note that FIG. 3(*a*) shows that for $S_a$ up to about 0.5 g, a linear approximation for the mean damage factor y(s) is reasonable; beyond 0.5 g, FIG. 3(*b*) shows that v(s) is so small that the integrand of Equation 1 makes little contribution. This observation motivated the linear approximation for y(s) introduced in Equation 11.

Figures 4, 5, 5A, 5B:
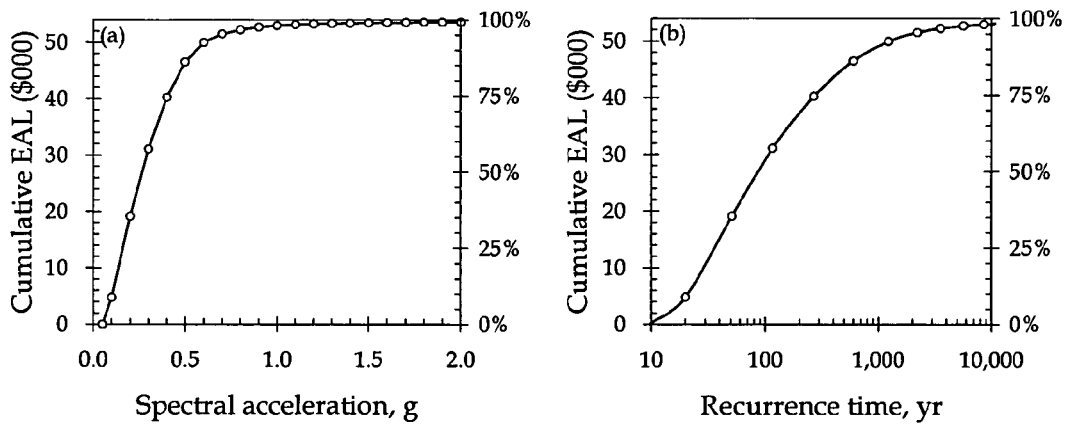
FIG. 4 is a table illustrating an approximation of earthquake loss using probable frequent loss (PFL)
FIG. 5a is a graph illustrating a cumulative contribution to expected annualized loss (EAL) considering only Spectral acceleration $(S_a) \leqq 0.1$ g, then $S_a \leqq 0.2$ g, etc., with the results plotted against $S_a$.
FIG. 5b is a graph illustrating a cumulative contribution to EAL considering only Spectral acceleration $(S_a) \leqq 0.1$ gravity unit (g), then $S_a \leqq 0.2$ g, etc., plotted against mean recurrence time.

Using the detailed seismic vulnerability function and mean site shaking hazard function of FIG. 3, EAL was calculated by Method 1. Equation 9 produces a value of EAL=$54,000 for $S_a \leq 2.0$ g, where the remainder term, R, has an (negligible) upper bound of $37. For illustrative purposes, EAL was evaluated under Methods 2 and 3 taking $S_{NZ}$=0.05 g and $S_{EBE} \approx 0.2$ g. FIG. 4 compares the values of PFL and EAL calculated using the three methods. Note that PFL for Method 2 is taken from the ABV analysis of Method 1. The difference between the PFL values for Methods 1 and 3 is due to the linear approximation of structural response. Agreement is reasonable: Methods 2 and 3 produce EAL estimates within about 30% of that of Method 1. That Method 3 produces a reasonable estimate is particularly promising: at least in this case, an individual need not create a non-linear structural model to get a reasonable estimate of PFL and EAL.

For further illustration, three additional tests of EBE and Method 2 are shown. First, Equation 9 was evaluated at each of n=1, 2, . . . 20, for $\Delta s$=0.1 g. As shown in FIG. 5, the resulting plot shows the cumulative contribution to EAL considering only $S_a \leq 0.1$ g, then $S_a \leq 0.2$ g, etc. FIG. 5(*a*) shows the results plotted against $S_a$, while FIG. 5(*b*) shows the same information plotted against mean recurrence time. As shown, only about 15% of cumulative economic loss comes from events such as the PML-level shaking or greater ($S_a$>0.5 g). As important as the 500-year earthquake is as a design basis for life safety, it is largely irrelevant here for economic considerations. Almost half the expected losses for this building result from shaking of $S_a \leq 0.25$ g, i.e., events with a recurrence time of 85 years or less. Approximately 35% of loss is due to $S_a \leq S_{EBE}$. Ideally, cumulative loss from $S_a \leq S_{EBE}$ would always be near 50%, which would suggest that $S_{EBE}$ is a good representative scenario shaking level, but the fraction will likely vary between buildings, so a cumulative EAL fraction of 35% at the $S_{EBE}$ defined this way seems acceptable.

Figure 7:
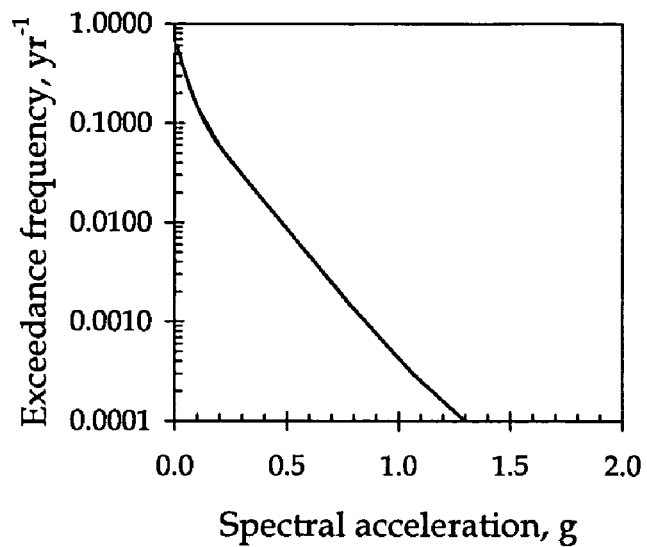
FIG. 7 is a graph illustrating a seismic hazard function $G(S_a)$ for a site in Los Angeles, Calif., United States.

CUREE—Caltech Wood frame Project Buildings: As a second example test of EBE and of Method 2, Methods 1 and 2 were compared using 14 hypothetical (but completely designed) buildings from the CUREE-Caltech Woodframe Project, discussed further in "Improving Loss Estimation for Woodframe Buildings," by Porter, K. A., Beck, J. L., Seligson, H. A., Scawthorn, C. R., Tobin, L. T., and Boyd, T., 2002b, for the Consortium of Universities for Research in Earthquake Engineering, Richmond, Calif. The buildings are variants of four basic designs referred to as index buildings. The index buildings include a small house (single story, 1,200 square feet (sq.ft.), stucco walls, no structural sheathing), a large house (two stories, 2,400 sq.ft., some walls sheathed with plywood or OSB, stucco exterior finish), a three-unit townhouse (two stories, 6,000 sq.ft. total, some walls sheathed with plywood or OSB, stucco exterior finish), and an apartment building (three stories, 13,700 sq.ft., 10 dwelling units, and tuck-under parking). Each index building included four or more variants: a poor-quality version, a typical-quality version, a superior-quality version, and one or more alternative designs or retrofits. These wood frame buildings were considered to be at an arbitrary site, chosen to be in Los Angeles, Calif., at 33.9° N, 118.2° W. In determining the site hazard, adjusting for the National Earthquake Hazards Reduction Program (NEHRP) soil category D, $S_{EBE}$ was found to be equal to 0.4 g. Of the nineteen buildings examined in Porter et al. (2002b), fourteen have non-zero loss estimates at $S_{EBE}$. Their seismic vulnerability functions are shown in FIG. 6. They are shown with a logarithmic y-axis because of the low losses suffered at lower shaking intensities. The site hazard is shown in FIG. 7. The jaggedness of some of the vulnerability functions reflects sensitivity to collapse (which was modeled in these cases).

Figure 8:
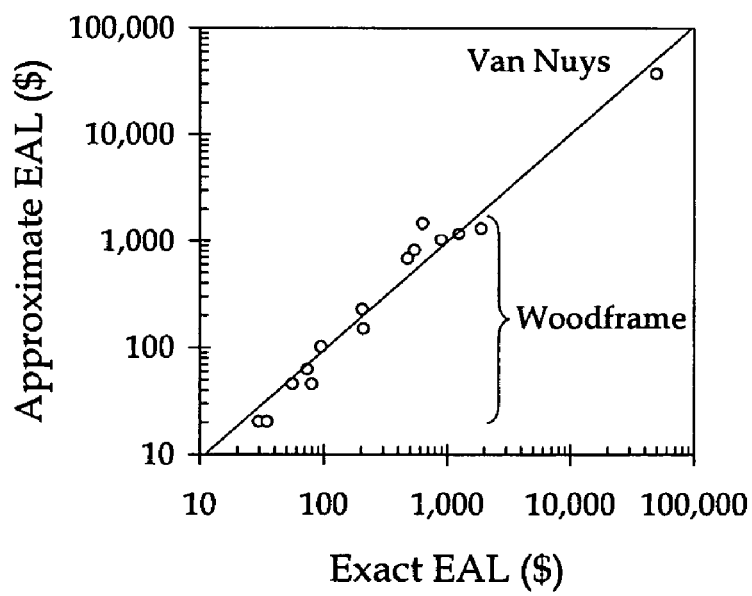
FIG. 8 is a graph illustrating a comparison of approximate versus exact EAL by Methods 1 and 2 for 15 sample buildings, Method 1 being a current method of calculating EAL through integrating seismic vulnerability and hazard, and Method 2 being a method of calculating EAL using a Probable Frequent Loss (PFL) according to the present invention.

FIG. 8 shows the EAL values for these fourteen wood frame buildings and for the Van Nuys building calculated by Method 1 (referred to in the FIG. as "exact") and by Method 2 (referred to as "approximate"), using EBE as defined above. EAL estimated under Method 1 is denoted by $EAL_1$. Estimation error is defined as $$\varepsilon \equiv \frac{EAL_2 - EAL_1}{EAL_1}. \quad (27)$$

The error for each case-study building was taken as a sample of $\varepsilon$. The sample mean and sample standard deviation of this error are $\bar{\varepsilon}=0.12$ and $s_\varepsilon=0.52$, respectively. Thus, for this sample of fifteen buildings, the use of $S_{EBE}$ defined as the shaking with 10% exceedance probability over 5 years produces a fairly modest (12%) error in the estimate of EAL, relative to the "exact" method, which requires analysis of the complete seismic vulnerability function.

As a final test, the error was calculated defining $S_{EBE}$ as shaking with 50% exceedance probability in 50 years, and found $\bar{\varepsilon}=0.06$ and $s_\varepsilon=0.47$. Defining EBE this way produces slightly more accurate results for the case-study buildings than using shaking intensity with 10% exceedance probability in 5 years, although at the cost of meaningful risk communication.

The EAL values shown in FIG. 8 might be quite meaningful to the real estate investor. In the case of the pre-Northridge Van Nuys building, the replacement cost is approximately $7.0M and the annual net operating income is on the order of $1M, an EAL of $54,000 represents a significant expense. The EALs for the poorer-performing wood frame buildings can exceed $1,000 annually. This may be a significant expense for a small investor. These figures are valuable in assisting investors in their financial analysis during the due-diligence phase.

E. Using Seismic Risk in Real Estate Investment Decision-Making

The previous sections have suggested that PFL and EAL can be calculated for an individual facility using linear assembly-based vulnerability, together with a site economic hazard coefficient H that can be mapped or tabulated. It was suggested that an investor could use PFL as a meaningful scenario loss and EAL as an operating expense to account for seismic risk during a standard financial analysis of an investment opportunity. It was further shown that EAL can be estimated based on PFL and on H, that EAL in the cases discussed here represents a significant expense worthy of consideration in a financial analysis, and that, if considered, EAL would help to make seismic risk a market force.

When one examines seismic risk in the context of the larger investment decision, some additional questions arise: How important is the uncertainty of future earthquake repair costs, compared with the market-related uncertainties of investment value? How can one treat both sources of uncertainty in a rigorous decision-making methodology?

Some of the sources of uncertainty of investment value have been mentioned herein, most notably future market rents and vacancy rates. This uncertainty is referred to as market risk, and it can be large. An article entitled, "The role of uncertainty in investment: an examination of competing investment models using commercial real estate data," by Holland, A. S., Ott, S. H., and Riddiough, T. J., 2000, for Real Estate Economics, inferred the volatility of real estate return from volatility of commercial mortgage interest rates along with other observable variables, and from the standard deviation of daily rates of return on equity real estate investment trusts (REITs), as part of a larger study of how uncertainty affects the rate of investment. They found that the implied volatility of the capitalization rate for commercial real estate (i.e., the standard deviation of the difference between return in two successive years) is on the order of 0.15 to 0.30. Depending on how one models the long-term effects of volatility, and how much information one assumes the investor has, the coefficient of variation (COV) of property value can exceed 6, a very high value (Beck et al. 2002)! Even if the "true" uncertainty of market value were an order of magnitude less, say having a COV of 0.5 to 1.0, this would mean that market uncertainty could swamp uncertainty of future earthquake economic losses.

How can information about uncertainty in property value be used to inform an investment or risk-management decision? A well-established discipline of economics called decision analysis deals explicitly with high-stakes decisions under conditions of substantial uncertainty. Briefly, in a decision-analysis approach, a decision is framed as a situation in which a decision-maker chooses between two or more mutually exclusive alternatives, each of which can have uncertain outcomes measured in economic or other value terms. The decision-maker's preferences are encoded in a utility function, a relationship between value outcome (e.g., the decision-maker's uncertain future wealth, denoted here by x) and an abstract parameter called utility (denoted here by u) that can be thought of as quantifying the desirability of possible outcomes, with more utility meaning a more-desirable outcome. The preferable alternative is the one that offers the highest expected value of utility, E[u].

Because the utility function is monotonically increasing in x, the desireable alternative is also the one that offers the highest value of certainty equivalent (CE), defined as the inverse of the utility function evaluated at the expected value of utility, $CE=u^{-1}(E[u])$. If the utility function measures the desirability of a monetary outcome, then CE has units of money, and is equivalent to the amount of money one should accept for certain in exchange for an uncertain bet. In other words, CE measures in money terms what the bet is worth to the decision-maker, considering the uncertainty of the outcome and his or her risk attitude. A convenient idealization of a decision-maker's utility function is the exponential form $$u(x)=1-\exp(-x/r), \quad (28)$$

where u(x) is the decision-maker's utility of the wealth state x and r, referred to as risk tolerance, is a constant in units of money that reflects the decision-maker's risk attitude. A larger value of r means the decision maker more closely approaches a risk-neutral attitude, where only the expected value of x is considered. This form of the utility function has the interesting feature that, if x represents change in the decision-maker's wealth state rather than absolute wealth state, decisions that optimize E[u] or CE still satisfy the rules of decision analysis, meaning that one can examine an uncertain deal in isolation, ignoring other effects on the decision-maker's wealth.

Decision analysis can address market risk and uncertainty in earthquake loss to select an optimum decision alternative that maximizes CE. In the case of a real estate investment opportunity, the CE of purchasing a property is a function of an uncertain future net income stream (rental and other income less operating and other expenses besides earthquake repair costs), the purchase price, uncertain future earthquake repair costs, the variance of net income and of earthquake repair costs, and the decision-maker's risk tolerance, r. The uncertain present value of the net income stream is denoted by I; it is typically quantified during the investor's financial analysis of a potential purchase. The uncertain present value of future earthquake repair costs is denoted by L. One can show that CE can be expressed as:

$$CE = E[I] - C_0 - E[L] - \frac{\text{Var}[I] + \text{Var}[L]}{2r} - rR, \quad (29)$$

where
E[I]=expected present value of the future net income stream;
$C_0$=purchase price;
E[L]=expected present value of future seismic losses;
Var[I]=variance of the present value of the net income stream (a measure of market risk);
Var[L]=variance of the present value of future seismic losses;
r=risk tolerance of Equation 28; and
R=remainder terms associated with higher-order moments of income and seismic loss.

If market risk produces a coefficient of variation of at least 0.5 to 1.0, as implied by an analysis of the Holland et al. (2000) study, then the variance term is dominated by market risk, not only for the Van Nuys building but likely for most commercial investment properties. The remainder rR is small compared with E[L] for most decision-makers. Recognizing that E[L] for a planning period of t and a risk-free real interest rate of i is simply $$E[L] = EAL \cdot \left(\frac{1 - \exp(-it)}{i}\right) = H \cdot PFL \cdot \left(\frac{1 - \exp(-it)}{i}\right), \quad (30)$$

then the certainty equivalent of Equation 29 can be approximated by $$CE = E[I] - C_0 - H \cdot PFL \cdot \left(\frac{1 - \exp(-it)}{i}\right) - \frac{\text{Var}[I]}{2r}. \quad (31)$$

The first three terms in Equation 31 are the risk-neutral part, i.e., the value of CE is the risk tolerance r→∞. This portion can be calculated in the standard financial analysis and due-diligence study that the bidder undertakes. Variance of income can be estimated based on studies such as Holland et al. (2000) or using the investor's judgment. Note from Equation 31 that increasing market uncertainty or decreasing risk tolerance reduces the certainty equivalent of a real estate investment below its risk-neutral value, as might be expected.

Beck et al. (2002) presented a methodology for eliciting decision-maker risk tolerance. In a study of six U.S. and four Japanese investors, it was found that one can estimate r as a function of the investor's annual budget or the size of investments he or she typically makes. For example, an investor in the Van Nuys building would have r on the order of $100M.

r, EAL, and market risk can be used to calculate CE for the Van Nuys building under four investment alternatives: (1) do not buy; (2) buy and do not mitigate seismic risk ("as-is"); (3) buy and purchase earthquake insurance; or (4) buy and perform a seismic retrofit. The retrofit involved adding shearwalls to the structural system; see Beck et al. (2002) for the modified structural model, hazard, and resulting vulnerability function. Assuming a risk-free real discount rate of 2%, an annual insurance premium equal to 3.5% of the insured limit, and a capitalization rate of 0.13 (pre-tax annual net income as a fraction of purchase price), it was found that the CE for alternative 2 (i.e. buy and do not mitigate seismic risk) was the greatest of the four alternatives, meaning that the best choice of the four is to buy and not to retrofit, as illustrated in FIG. 9. Note how small uncertainty in earthquake loss is compared with uncertainty in income.

For further illustration, sensitivity studies were performed, varying the discount rate, risk tolerance, variance of income, and the price of insurance over reasonable bounds. Results from the sensitivity studies found that under most conditions, the best choice was to buy and not to retrofit. For conditions of low risk tolerance (r<$25 million) or high uncertainty of net income (COV[I]>2), the best choice was not to buy. In the sample studies, no conditions were identified under which it was preferable to buy insurance or to seismically retrofit the building. Note, however, that the present discussion did not treat the risk of injury or death from earthquakes, which could make a material difference in an investment decision. See Appendix A for further discussion regarding seismic risk.

F. Data Processing System

The present invention also comprises a system for risk management. Through use of a data processing system, the risk management method can be incorporated into a Website. The Website allows users to access it over the Internet so that users can interact with system or download a copy of a computer program product containing computer executable instructions for operating the method described herein. Alternatively, the system can be loaded onto a home computer or laptop computer where a user interacts with the computer to manage risk.

Figure 10:
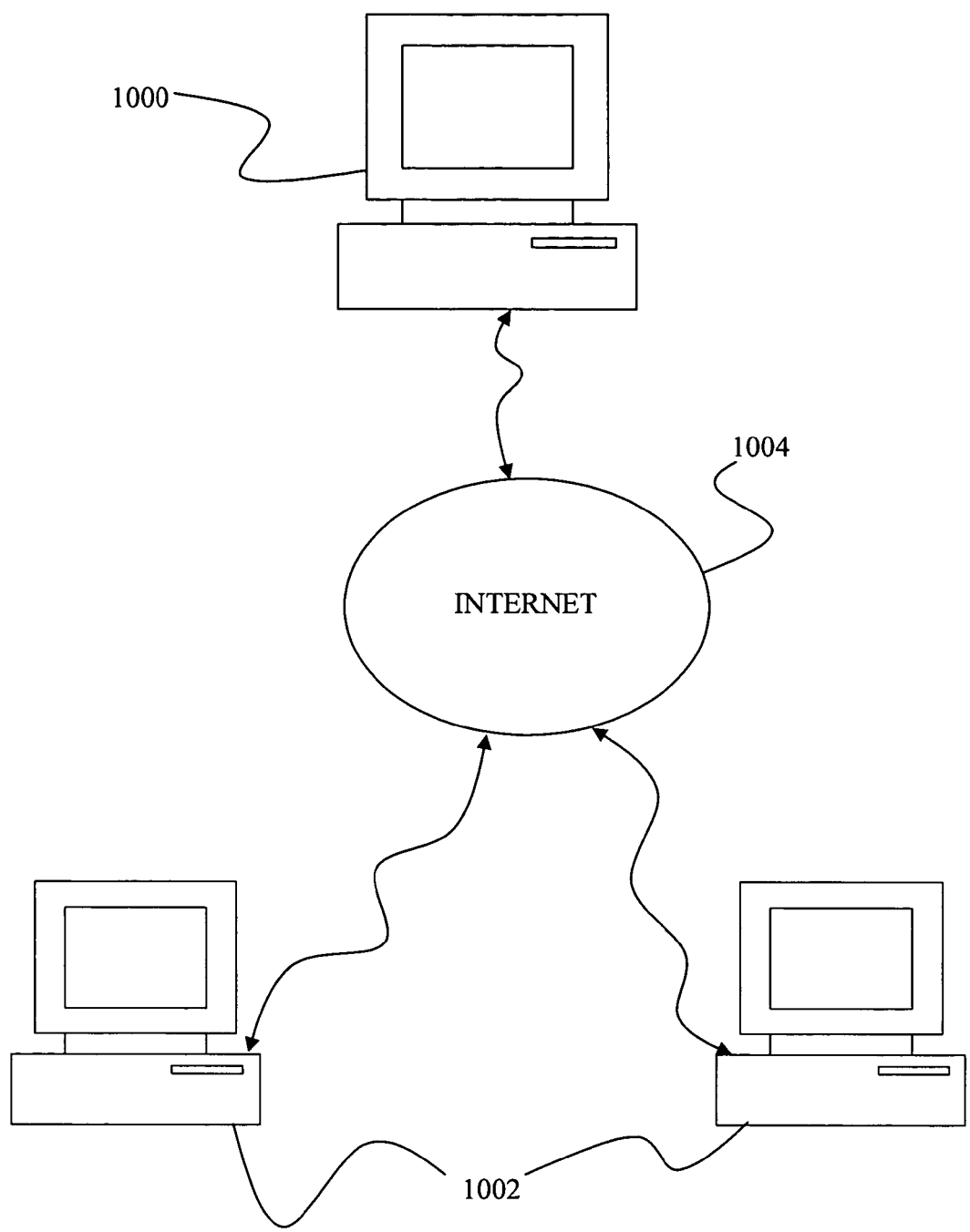
FIG. 10 is an illustration depicting an Internet-based system for risk management according to the present invention.

FIG. 10 illustrates a data processing system 1000 (e.g., server computer) incorporating the operations of the method described above. The method utilizes the data processing system 1000 for storing computer executable instructions as components for causing a processor to carry out the operations. The data processing system 1000 may be accessible by a user's computer 1002 over the Internet 1004 through an Internet-accessing user interface (e.g., web page).

In another aspect, the computer executable instructions for causing a processor to carry out the operations of the method can be loaded onto the user's computer 1002, personal digital assistant, or any other computing device. In this aspect, the user's computer 1002 functions as the data processing system 1000.

Figure 11:
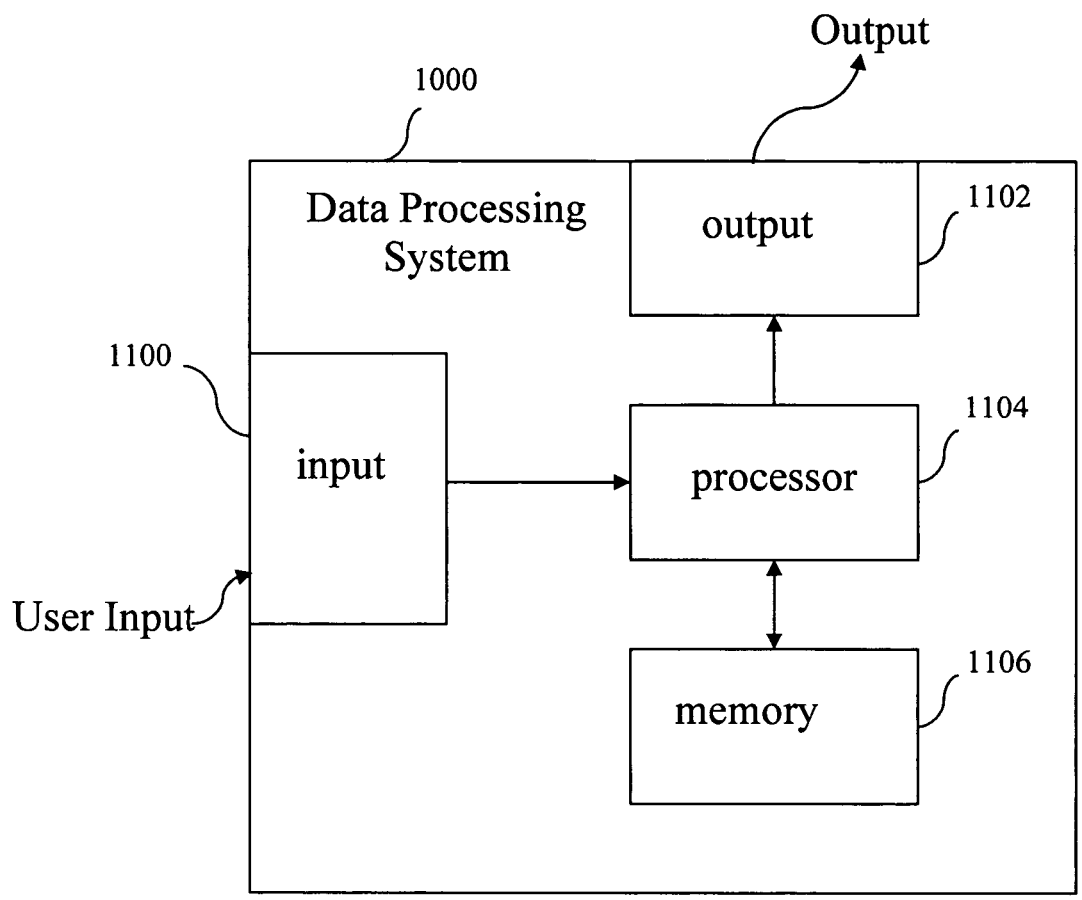
FIG. 11 is a block diagram of a general computer system for use with the present invention.

A block diagram depicting the components of the data processing system 1000 used in the present invention is provided in FIG. 11. The data processing system 1000 comprises an input 1100 for receiving information from a user. Information received may include input from devices such as scanners, keypads, keyboards, mic, other peripherals such as storage devices, other programs, etc. The input 1100 may include multiple "ports." An output 1102 is connected with the processor for providing information for transmission to other data processing systems, to storage devices, to display devices such as monitors, to generating information necessary for delivery, and to other mechanisms for presentation in user-readable forms. Output may also be provided to other devices or other programs, e.g., to other software modules, for use therein. The input 1100 and the output 1102 are both coupled with a processor 1104, which may be a general-purpose computer processor or a specialized processor designed specifically for use with the present invention. The processor 1104 is coupled with a memory 1106 to permit storage of data and software to be manipulated by commands to the processor.

G. Computer Program Product

Figure 12:
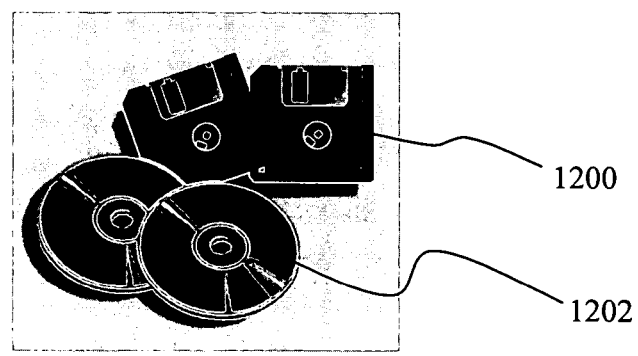
FIG. 12 is an illustrative diagram of a computer-readable medium aspect of the present invention; and Appendix A is an article co-authored by an inventor of the present invention, discussing seismic risk within the broader context of commercial real estate investment decisions. The copyright to the article is owned by Earthquake Spectra, a journal of the Earthquake Engineering Research Institute, located at 499 14th Street, Suite 320, Oakland, Calif., 94612, United States. Permission was granted by Earthquake Spectra to include the article as an Appendix to this patent application.

An illustrative diagram of a computer program product embodying the present invention is depicted in FIG. 12. As a non-limiting example, the computer program product is depicted as either a floppy disk 1200 or an optical disk 1202. However, as mentioned previously, the computer program product generally represents computer-readable code stored on any compatible computer-readable medium for causing a processor to carry out the operations of the above described method.

(6) Conclusion

Probabilistic repair costs can be dominated by small, frequent events, as opposed to rare, PML-level losses. Using a concrete building and 14 additional woodframe buildings as examples, it was shown that expected annualized loss (EAL) is approximately proportional to a scenario loss referred to as the probable frequent loss (PFL), defined similarly to PML. The constant of proportionality, referred to here as the site economic hazard coefficient (H), can be mapped or tabulated for ready use by structural engineers or investors. PFL can be defined as the expected value of loss conditioned on the occurrence of an economic-basis earthquake, a non-limiting example of which includes the occurrence of a shaking with approximately 10% exceedance probability in approximately 5 years. The economic-basis earthquake, EBE, is named and defined intentionally similar to the design-basis earthquake (DBE) of older codes. The present invention demonstrates that a simplified loss-analysis approach, referred to as linear assembly-based vulnerability (LABV), can produce a reasonable estimate of PFL and consequently EAL. Additionally, from a real estate investor's viewpoint, uncertainty in earthquake repair cost can be negligible compared with uncertainties arising from real estate market volatility.

A common opportunity for seismic risk-management is the bidding phase just prior to the purchase of commercial real estate in seismically active regions. Common practice currently produces little information that actually helps investors consider seismic risk in their investment decision. Consequently, this most-common opportunity for risk-management is usually a missed opportunity. The present invention alleviates this problem by using PFL rather than (or in addition to) PML. PFL offers several advantages as a metric of investment performance, non-limiting examples of which include:

1. It better reflects investors' typical planning period and would be more meaningful as an upper-bound loss than PML, which tends to reflect too-rare an event to the investor.
2. EAL is proportional to PFL through a site economic hazard coefficient H, which can be mapped.
3. EAL can be used as an operating expense in the investment financial analysis to reflect seismic risk and thus to make seismic risk more of a market parameter.
4. Because of its similarity to PML, PFL should be readily understood by engineers and investors, and could be calculated during the due-diligence phase of the bidding process.
5. At shaking levels addressed by the PFL, it is likely that linear structural analysis can be used to estimate loss with acceptable accuracy. User-friendly software exists to perform linear structural analysis quickly; with practical extensions, this type of software could be used to calculate PFL and EAL inexpensively, within the budget of a due-diligence study, and therefore competitively with loss-estimation software that relies on expert opinion.
6. In the case studies, defining $S_{EBE}$ as the level of shaking with approximately 50% exceedance probability in approximately 50 years was shown to improve the accuracy of the EAL approximation slightly, but at the cost of meaningful risk communication for the investor.

Finally, the present invention discloses how formal decision analysis can be used in the investment decision process to account for real estate market risk, future earthquake losses, and the investor's risk attitude, and to choose among competing risk-management alternatives based on the maximum certainty equivalent. The decision-analysis approach requires the additional information of variance of market value and the decision-maker's risk tolerance. Variance of earthquake repair costs is not needed, since it makes a negligible contribution in the decision analysis compared with the uncertainty in market conditions.

What is claimed is:

1. A computer-implemented method for structure risk management, the method comprising acts of:

receiving, as an input by an automated programmed electronic computer, a site loss parameter, wherein the site loss parameter is a loss associated with a physical structure;

receiving, as an input by the automated programmed electronic computer, a loss given a loss-basis event, wherein the loss given a loss-basis event is a loss associated with a physical event;

determining, with the automated programmed electronic computer, a statistic of loss per unit time for presentation to a user, wherein the statistic is a product of the site loss parameter and the loss given a loss-basis event;

wherein the statistic is an average repair cost per unit time resulting from the physical event;

wherein in the act of determining a statistic of loss per unit time, the statistic of loss per unit time is an annualized expected loss (EAL), the EAL being an average repair cost per year resulting from future seismic activity, the average being an average selected from a group consisting of a mean, median, and mode;

wherein in the act of determining a statistic of loss per unit time, the EAL is further determined according to the following, $$EAL = H \cdot PFL,$$

wherein H represents the site economic hazard parameter;

wherein PFL represents a probable frequent loss, mean loss conditioned on an occurrence of $S_{EBE}$;

where $S_{EBE}$ represents a seismic intensity associated with an economic-basis-earthquake (EBE), whereby through calculating the EAL, the EAL is used to manage seismic risk;

wherein H is calculated according to the following, $$H = \frac{G_{NZ}}{\ln(G_{NZ}/G_{EBE})},$$

wherein $G_{NZ}$ represents a mean annual exceedance frequency of $S_{NZ}$, $S_{NZ}$ represents a seismic intensity associated with initiation of loss, and $G_{EBE}$ represents a mean annual exceedance frequency of $S_{EBE}$, wherein $G_{EBE}$ is calculated according to the following, $$G_{EBE} = -\ln(1-P_{EBE})/t_{EBE},$$

wherein $P_{EBE}$ represents a probability of exceeding $S_{EBE}$ in time $t_{EBE}$, and $t_{EBE}$ represents a planning period associated with EBE; and presenting to a user through a display the statistic of loss per unit time.

2. A method for risk management as set forth in claim 1, wherein in the act of calculating a statistic of loss per unit time, the site loss parameter is a loss selected from a group consisting of a casualty and economic loss, creating a site casualty parameter and a site economic parameter.

3. A method for risk management as set forth in claim 2, wherein in the act of calculating a statistic of loss per unit time, the loss-basis event is a loss selected from a group consisting of a casualty and economic loss, creating a casualty-basis event and an economic-basis event.

4. A method for risk management as set forth in claim 3, further comprising an act of defining an economic-basis-earthquake (EBE), the EBE being an event that produces a site shaking with a stated exceedance probability during a stated number of years.

5. A method for risk management as set forth in claim 4, wherein in the act of defining the economic-basis-earthquake, the stated exceedance probability is approximately 10% and the stated number of years is approximately 5 years.

6. A method for risk management as set forth in claim 5, wherein $S_{EBE}$ is calculated according to the following, $$S_{EBE} = G^{-1}(G_{EBE}),$$

wherein $G(s)$ represents the mean annual exceedance frequency of shaking intensity s, and $G^{-1}(g)$ represents the inverse of $G(s)$ evaluated at a particular value g.

7. A method for risk management as set forth in claim 6, further comprising an act of estimating the PFL, the PFL representing a point on a mean seismic vulnerability function for a frequent shaking intensity.

8. A method for risk management as set forth in claim 7, wherein in the act of estimating PFL, PFL is estimated from a method selected from a group consisting of employing assembly-based vulnerability at intensity level $S_{EBE}$, employing linear assembly-based vulnerability at intensity level $S_{EBE}$, and employing expert opinion.

9. A method for risk management as set forth in claim 8, wherein employing assembly-based vulnerability at intensity level $S_{EBE}$ further comprises acts of:

selecting a ground-motion time history and creating a stochastic structural model;

performing a non-linear time history structural analysis using the ground-motion time history and the structural model to determine structural response;

assessing probabilistic damage via component fragility functions evaluated using results from the structural response;

assessing loss via probabilistic construction cost-estimation and results of the assessed probabilistic damage; and repeating acts of selecting the ground-motion time history, creating the stochastic structural model, performing the non-linear structural analysis, assessing the probabilistic damage, assessing the loss to estimate a probability distribution of loss at $S_{EBE}$, and calculating the loss statistic PFL.

10. A method for risk management as set forth in claim 8, wherein employing linear assembly-based vulnerability at intensity level $S_{EBE}$ further comprises acts of:

defining a facility using a facility defining parameter, the facility defining parameter being selected from a group consisting of location, including latitude and longitude, site soils, substructure, and structural and nonstructural components;

using the defined facility to create an inventory of damageable assemblies and identifying each assembly's engineering demand parameter (EDP);

determining the $S_{EBE}$;

analyzing a structure by calculating a structural response to which each damageable assembly is subjected; and analyzing damage and loss estimates to calculate an expected total cost to repair the structure according to the following, $$PFL = (1 + \overline{C}_{OP})\sum_{k=1}^{N} \overline{y}_k(x_k),$$

where subscript k refers to particular assemblies, N refers to a number of damageable assemblies, $\overline{y}_k$, refers to a mean repair cost to assembly k, $x_k$, refers to an engineering demand parameter for assembly k, and $\overline{C}_{OP}$ refers to contractor's mean overhead-and-profit factor.

11. A method for risk management as set forth in claim 10, wherein in the act of determining $S_{EBE}$, $S_{EBE}$ is determined using a damped elastic spectral acceleration response at the site's small-amplitude fundamental period of vibration, $S_a(T_1)$, and is adjusted to account for site classification.

12. A method for risk management as set forth in claim 11, further comprising an act of calculating a certainty equivalent with the EAL, the certainty equivalent calculated according to the following, $$CE = E[I] - C_0 - E[L] - \frac{\text{Var}[I] + \text{Var}[L]}{2r} - rR,$$

wherein E[I] represents an expected present value of a future net income stream, Co represents a purchase price, E[L] represents an expected present value of future seismic losses, Var[I] represents a variance of the present value of the net income stream and is considered a measure of market risk, Var[L] represents a variance of a present value of future seismic losses, r represents risk tolerance, and R represents remainder terms associated with higher-order moments of income and seismic loss.

13. A method for risk management as set forth in claim 9, further comprising an act of calculating a certainty equivalent with the EAL, the certainty equivalent calculated according to the following, $$CE = E[I] - C_0 - E[L] - \frac{\text{Var}[I] + \text{Var}[L]}{2r} - rR,$$

wherein E[I] represents an expected present value of a future net income stream, Co represents a purchase price, E[L] represents an expected present value of future seismic losses, Var[I] represents a variance of the present value of the net income stream and is considered a measure of market risk, Var[L] represents a variance of a present value of future seismic losses, r represents risk tolerance, and R represents remainder terms associated with higher-order moments of income and seismic loss.

14. A method for risk management as set forth in claim 1, wherein in the act of calculating a statistic of loss per unit time, the loss-basis event is a loss selected from a group consisting of a casualty and economic loss, creating a casualty-basis event and an economic-basis event.

15. A method for risk management as set forth in claim 1, wherein $S_{EBE}$ is calculated according to the following, $$S_{EBE} = G^{-1}(G_{EBE}),$$

wherein G(s) represents the mean annual exceedance frequency of shaking intensity s, and $G^{-1}(g)$ represents the inverse of G(s) evaluated at a particular value g.

16. A method for risk management as set forth in claim 1, further comprising an act of estimating the PFL, the PFL representing a point on a mean seismic vulnerability function for a frequent shaking intensity.

17. A method for risk management as set forth in claim 16, wherein in the act of estimating PFL, PFL is estimated from a method selected from a group consisting of employing assembly-based vulnerability at intensity level $S_{EBE}$, employing linear assembly-based vulnerability at intensity level $S_{EBE}$, and employing expert opinion.

18. A method for risk management as set forth in claim 17, wherein employing assembly-based vulnerability at intensity level $S_{EBE}$ further comprises acts of:
- selecting a ground-motion time history and creating a stochastic structural model;
- performing a non-linear time history structural analysis using the ground-motion time history and the structural model to determine structural response;
- assessing probabilistic damage via component fragility functions evaluated using results from the structural response;
- assessing loss via probabilistic construction cost-estimation and results of the assessed probabilistic damage; and
- repeating the acts of selecting the ground-motion time history, creating the stochastic structural model, performing the non-linear structural analysis, assessing the probabilistic damage, assessing the loss to estimate a probability distribution of loss at $S_{EBE}$, and calculating the loss statistic PFL.

19. A method for risk management as set forth in claim 17, wherein employing linear assembly-based vulnerability at intensity level $S_{EBE}$ further comprises acts of:
- defining a facility using a facility defining parameter, the facility defining parameter being selected from a group consisting of location, including latitude and longitude, site soils, substructure, and structural and nonstructural components;
- using the defined facility to create an inventory of damageable assemblies and identifying each assembly's engineering demand parameter (EDP);
- determining the $S_{EBE}$;
- analyzing a structure by calculating a structural response to which each damageable assembly is subjected; and
- analyzing damage and loss estimates to calculate an expected total cost to repair the structure according to the following, $$PFL = (1 + \overline{C}_{OP}) \sum_{k=1}^{N} \overline{y}_k (x_k),$$

where subscript k refers to particular assemblies, N refers to a number of damageable assemblies, $\overline{y}_k$, refers to a mean repair cost to assembly k, $x_k$ refers to an engineering demand parameter for assembly k, and $\overline{C}_{OP}$ refers to contractor's mean overhead-and-profit factor.

20. A method for risk management as set forth in claim 19, wherein in the act of determining $S_{EBE}$, $S_{EBE}$ is determined using a damped elastic spectral acceleration response at the site's small-amplitude fundamental period of vibration, $S_a(T_1)$, and is adjusted to account for site classification.

21. A method for risk management as set forth in claim 1, further comprising an act of calculating a certainty equivalent with the EAL, the certainty equivalent calculated according to the following, $$CE = E[I] - C_0 - E[L] - \frac{\text{Var}[I] + \text{Var}[L]}{2r} - rR,$$

wherein E[I] represents an expected present value of a future net income stream, Co represents a purchase price, E[L] represents an expected present value of future seismic losses, Var[I] represents a variance of the present value of the net income stream and is considered a measure of market risk, Var[I] represents a variance of a present value of future seismic losses, r represents risk tolerance, and R represents remainder terms associated with higher-order moments of income and seismic loss.

22. A method for risk management as set forth in claim 1, further comprising an act of defining an economic-basis-earthquake (EBE), the EBE being an event that produces a site shaking with a stated exceedance probability during a stated number of years.

23. A method for risk management as set forth in claim 22, wherein in the act of defining the economic-basis-earthquake, the stated exceedance probability is approximately 10% and the stated number of years is approximately 5 years.

24. A computer program product executable by a computer processor for structure risk management, the computer program product comprising:
- computer-readable instructions, stored on a non-transitory computer-readable medium, for causing a computer, when executed by the computer processor, to perform operations of:
  - receiving, as an input by an automated programmed electronic computer, a site loss parameter, wherein the site loss parameter is a loss associated with a physical structure;
  - receiving, as an input by the automated programmed electronic computer, a loss given a loss-basis event, wherein the loss given a loss-basis event is a loss associated with a physical event;
  - determining, with the automated programmed electronic computer, a statistic of loss per unit time for presentation to a user, wherein the statistic is a product of the site loss parameter and the loss given a loss-basis event;

wherein the statistic is an average repair cost per unit time resulting from the physical event;

wherein in the computer-readable instructions for determining a statistic of loss per unit time, the statistic of loss per unit time is an annualized expected loss (EAL), the EAL being an average repair cost per year resulting from future seismic activity, the average being an average selected from a group consisting of a mean, median, and mode;

wherein in the computer-readable instructions for determining a statistic of loss per unit time, the EAL is further determined according to the following, $$EAL = H \cdot PFL,$$

wherein H represents the site economic hazard parameter;

wherein PFL represents a probable frequent loss, mean loss conditioned on an occurrence of $S_{EBE}$;

where $S_{EBE}$ represents a seismic intensity associated with an economic-basis-earthquake (EBE), whereby through calculating the EAL, the EAL is used to manage seismic risk;

wherein H is calculated according to the following, $$H = \frac{G_{NZ}}{\ln(G_{NZ}/G_{EBE})},$$

wherein $G_{NZ}$ represents a mean annual exceedance frequency of $S_{NZ}$, $S_{NZ}$ represents a seismic intensity associated with initiation of loss, and $G_{EBE}$ represents a mean annual exceedance frequency of $S_{EBE}$, wherein $G_{EBE}$ is calculated according to the following, $$G_{EBE} = -\ln(1-P_{EBE})/t_{EBE},$$

wherein $P_{EBE}$ represents a probability of exceeding $S_{EBE}$ in time $t_{EBE}$, and $t_{EBE}$ represents a planning period associated with EBE; and presenting to a user through a display the statistic of loss per unit time.

25. A computer program product as set forth in claim 24, wherein in the computer-readable instructions for calculating a statistic of loss per unit time, the site loss parameter is a loss selected from a group consisting of a casualty and economic loss, creating a site casualty parameter and a site economic parameter.

26. A computer program product as set forth in claim 25, wherein in the computer-readable instructions for calculating a statistic of loss per unit time, the loss-basis event is a loss selected from a group consisting of a casualty and economic loss, creating a casualty-basis event and an economic-basis event.

27. A computer program product as set forth in claim 26, further comprising a computer-readable instructions for defining an economic-basis-earthquake (EBE), the EBE being an event that produces a site shaking with a stated exceedance probability during a stated number of years.

28. A computer program product as set forth in claim 27, wherein in the computer-readable instructions for defining the economic-basis-earthquake, the stated exceedance probability is approximately 10% and the stated number of years is approximately 5 years.

29. A computer program product as set forth in claim, 28 wherein $S_{EBE}$ is calculated according to the following, $$S_{EBE} = G^{-1}(G_{EBE}),$$

wherein G(s) represents the mean annual exceedance frequency of shaking intensity s, and $G^{-1}(g)$ represents the inverse of G(s) evaluated at a particular value g.

30. A computer program product as set forth in claim 29, further comprising computer-readable instructions for estimating the PFL, the PFL representing a point on a mean seismic vulnerability function for a frequent shaking intensity.

31. A computer program product as set forth in claim 30, wherein in computer-readable instructions for estimating PFL, PFL is estimated from a method selected from a group consisting of employing assembly-based vulnerability at intensity level $S_{EBE}$, employing linear assembly-based vulnerability at intensity level $S_{EBE}$, and employing expert opinion.

32. A computer program product as set forth in claim 31, wherein the computer-readable instructions for estimating PFL employing assembly-based vulnerability at intensity level $S_{EBE}$, further comprises computer-readable instructions for:

selecting a ground-motion time history and creating a stochastic structural model;

performing a non-linear time history structural analysis using the ground-motion time history and the structural model to determine structural response;

assessing probabilistic damage via component fragility functions evaluated using results from the structural response;

assessing loss via probabilistic construction cost-estimation and results of the assessed probabilistic damage; and repeating the computer-readable instructions for selecting the ground-motion time history, creating the stochastic structural model, performing the non-linear structural analysis, assessing the probabilistic damage, assessing the loss to estimate a probability distribution of loss at $S_{EBE}$, and calculating the loss statistic PFL.

33. A computer program product as set forth in claim 31, wherein the computer-readable instructions for estimating PFL employing linear assembly-based vulnerability at intensity level $S_{EBE}$, further comprises computer-readable instructions for:

defining a facility using a facility defining parameter, the facility defining parameter being selected from a group consisting of location, including latitude and longitude, site soils, substructure, and structural and nonstructural components;

using the defined facility to create an inventory of damageable assemblies and identifying each assembly's engineering demand parameter (EDP);

determining the $S_{EBE}$;

analyzing a structure by calculating a structural response to which each damageable assembly is subjected; and analyzing damage and loss estimates to calculate an expected total cost to repair the structure according to the following, $$PFL = (1 + \overline{C}_{OP}) \sum_{k=1}^{N} \overline{y}_k(x_k),$$

where subscript k refers to particular assemblies, N refers to a number of damageable assemblies, $\overline{y}_k$, refers to a mean repair cost to assembly k, $x_k$ refers to an engineering demand parameter for assembly k, and $\overline{C}_{OP}$ refers to contractor's mean overhead-and-profit factor.

34. A computer program product as set forth in claim 33, wherein in the computer-readable instructions for determining $S_{EBE}$, $S_{EBE}$ is determined using a damped elastic spectral acceleration response at the site's small-amplitude fundamental period of vibration, $S_a(T_1)$, and is adjusted to account for site classification.

35. A computer program product as set forth in claim 34, further comprising a computer-readable instructions for calculating a certainty equivalent with the EAL, the certainty equivalent calculated according to the following, $$CE = E[I] - C_0 - E[L] - \frac{\text{Var}[I] + \text{Var}[L]}{2r} - rR,$$

wherein E[I] represents an expected present value of a future net income stream, Co represents a purchase price, E[L] represents an expected present value of future seismic losses, Var[I] represents a variance of the present value of the net income stream and is considered a measure of market risk, Var[L] represents a variance of a present value of future seismic losses, r represents risk tolerance, and R represents remainder terms associated with higher-order moments of income and seismic loss.

36. A computer program product as set forth in claim 32, further comprising a computer-readable instructions for calculating a certainty equivalent with the EAL, the certainty equivalent calculated according to the following, $$CE = E[I] - C_0 - E[L] - \frac{\text{Var}[I] + \text{Var}[L]}{2r} - rR,$$

wherein E[I] represents an expected present value of a future net income stream, Co represents a purchase price, E[L] represents an expected present value of future seismic losses, Var[I] represents a variance of the present value of the net income stream and is considered a measure of market risk, Var[L] represents a variance of a present value of future seismic losses, r represents risk tolerance, and R represents remainder terms associated with higher-order moments of income and seismic loss.

37. A computer program product as set forth in claim 24, wherein in the computer-readable instructions for calculating a statistic of loss per unit time, the loss-basis event is a loss selected from a group consisting of a casualty and economic loss, creating a casualty-basis event and an economic-basis event.

38. A computer program product as set forth in claim, 24 wherein $S_{EBE}$ is calculated according to the following, $$S_{EBE} = G^{-1}(G_{EBE}),$$

wherein G(s) represents the mean annual exceedance frequency of shaking intensity s, and $G^{-1}(g)$ represents the inverse of G(s) evaluated at a particular value g.

39. A computer program product as set forth in claim 24, further comprising a computer-readable instructions for estimating the PFL, the PFL representing a point on a mean seismic vulnerability function for a frequent shaking intensity.

40. A computer program product as set forth in claim 39, wherein in computer-readable instructions for estimating PFL, PFL is estimated from a method selected from a group consisting of employing assembly-based vulnerability at intensity level $S_{EBE}$, employing linear assembly-based vulnerability at intensity level $S_{EBE}$, and employing expert opinion.

41. A computer program product as set forth in claim 40, wherein the computer-readable instructions for estimating PFL employing assembly-based vulnerability at intensity level $S_{EBE}$, further comprises computer-readable instructions for:
    selecting a ground-motion time history and creating a stochastic structural model;
    performing a non-linear time history structural analysis using the ground-motion time history and the structural model to determine structural response;
    assessing probabilistic damage via component fragility functions evaluated using results from the structural response;
    assessing loss via probabilistic construction cost-estimation and results of the assessed probabilistic damage; and
    repeating the computer-readable instructions for selecting the ground-motion time history, creating the stochastic structural model, performing the non-linear structural analysis, assessing the probabilistic damage, assessing the loss to estimate a probability distribution of loss at $S_{EBE}$, and calculating the loss statistic PFL.

42. A computer program product as set forth in claim 40, wherein the computer-readable instructions for estimating PFL employing linear assembly-based vulnerability at intensity level $S_{EBE}$, further comprises computer-readable instructions for:
    defining a facility using a facility defining parameter, the facility defining parameter being selected from a group consisting of location, including latitude and longitude, site soils, substructure, and structural and nonstructural components;
    using the defined facility to create an inventory of damageable assemblies and identifying each assembly's engineering demand parameter (EDP);
    determining the $S_{EBE}$;
    analyzing a structure by calculating a structural response to which each damageable assembly is subjected; and
    analyzing damage and loss estimates to calculate an expected total cost to repair the structure according to the following, $$PFL = (1 + \overline{C}_{OP}) \sum_{k=1}^{N} \overline{y}_k(x_k),$$

where subscript k refers to particular assemblies, N refers to a number of damageable assemblies, $\overline{y}_k$ refers to a mean repair cost to assembly k, $x_k$ refers to an engineering demand parameter for assembly k, and $\overline{C}_{OP}$ refers to contractor's mean overhead-and-profit factor.

43. A computer program product as set forth in claim 42, wherein in the computer-readable instructions for determining $S_{EBE}$, $S_{EBE}$ is determined using a damped elastic spectral acceleration response at the site's small-amplitude fundamental period of vibration, $S_a(T_1)$, and is adjusted to account for site classification.

44. A computer program product as set forth in claim 24, further comprising a computer-readable instructions for calculating a certainty equivalent with the EAL, the certainty equivalent calculated according to the following, $$CE = E[I] - C_0 - E[L] - \frac{\text{Var}[I] + \text{Var}[L]}{2r} - rR,$$

wherein E[I] represents an expected present value of a future net income stream, Co represents a purchase price, E[L] represents an expected present value of future seismic losses, Var[I] represents a variance of the present value of the net income stream and is considered a measure of market risk, Var[L] represents a variance of a present value of future seismic losses, r represents risk tolerance, and R represents remainder terms associated with higher-order moments of income and seismic loss.

45. A computer program product as set forth in claim 24, further comprising a computer-readable instructions for defining an economic-basis-earthquake (EBE), the EBE being an event that produces a site shaking with a stated exceedance probability during a stated number of years.

46. A computer program product as set forth in claim 45, wherein in the computer-readable instructions for defining the economic-basis-earthquake, the stated exceedance probability is approximately 10% and the stated number of years is approximately 5 years.

47. A system for managing structure risk, comprising:
computer having a memory and a processor, the memory encoded with instructions for causing the computer to perform operations of:
receiving, as an input by an automated programmed electronic computer, a site loss parameter, wherein the site loss parameter is a loss associated with a physical structure;
receiving, as an input by the automated programmed electronic computer, a loss given a loss-basis event, wherein the loss given a loss-basis event is a loss associated with a physical event;
determining, with the automated programmed electronic computer, a statistic of loss per unit time for presentation to a user, wherein the statistic is a product of the site loss parameter and the loss given a loss-basis event;
wherein the statistic is an average repair cost per unit time resulting from the physical event;
wherein in the data processing system, the statistic of loss per unit time is an annualized expected loss (EAL), the EAL being an average repair cost per year resulting from future seismic activity, the average being an average selected from a group consisting of a mean, median, and mode;
wherein in the data processing system, the EAL is further calculated according to the following,

EAL=H·PFL, wherein H represents the site economic hazard parameter;
wherein PFL represents a probable frequent loss, mean loss conditioned on an occurrence of $S_{EBE}$;
where $S_{EBE}$ represents a seismic intensity associated with an economic-basis-earthquake (EBE), whereby through calculating the EAL, the EAL is used to manage seismic risk;
wherein H is calculated according to the following, $$H = \frac{G_{NZ}}{\ln(G_{NZ}/G_{EBE})},$$

wherein $G_{NZ}$ represents a mean annual exceedance frequency of $S_{NZ}$, $S_{NZ}$ represents a seismic intensity associated with initiation of loss, and $G_{EBE}$ represents a mean annual exceedance frequency of $S_{EBE}$;
wherein $G_{EBE}$ is calculated according to the following, $G_{EBE}=-\ln(1-P_{EBE})/t_{EBE}$, wherein $P_{EBE}$ represents a probability of exceeding $S_{EBE}$ in time $t_{EBE}$, and $t_{EBE}$ represents a planning period associated with EBE; and
presenting to a user through a display the statistic of loss per unit time.

48. A system as set forth in claim 47, wherein the site loss parameter is a loss selected from a group consisting of a casualty and economic loss, creating a site casualty parameter and a site economic parameter.

49. A system as set forth in claim 48, wherein the loss-basis event is a loss selected from a group consisting of a casualty and economic loss, creating a casualty-basis event and an economic-basis event.

50. A system as set forth in claim 49, further comprising an economic-basis earthquake component for defining an economic-basis earthquake (EBE), the EBE being an event that produces a site shaking with a stated exceedance probability during a stated number of years.

51. A system as set forth in claim 50, wherein in the economic-basis earthquake component, the stated exceedance probability is approximately 10% and the stated number of years is approximately 5 years.

52. A system as set forth in claim 50, wherein $S_{EBE}$ is calculated according to the following, $S_{EBE}=G^{-1}(G_{EBE})$, wherein G(s) represents the mean annual exceedance frequency of shaking intensity s, and $G^{-1}(g)$ represents the inverse of G(s) evaluated at a particular value g.

53. A system as set forth in claim 52, further comprising a PFL component for estimating the PFL, the PFL representing a point on a mean seismic vulnerability function for a frequent shaking intensity.

54. A system as set forth in claim 53, wherein in the PFL component, PFL is estimated from a method selected from a group consisting of employing assembly-based vulnerability at intensity level $S_{EBE}$, employing linear assembly-based vulnerability at intensity level $S_{EBE}$, and employing expert opinion.

55. A system as set forth in claim 54, wherein the PFL component for estimating PFL employing assembly-based vulnerability at intensity level $S_{EBE}$, further comprises components for:
selecting a ground-motion time history and creating a stochastic structural model;
performing a non-linear time history structural analysis using the ground-motion time history and the structural model to determine structural response;
assessing probabilistic damage via component fragility functions evaluated using results from the structural response;
assessing loss via probabilistic construction cost-estimation and results of the assessed probabilistic damage; and
repeating selecting the ground-motion time history, creating the stochastic structural model, performing the non-linear structural analysis, assessing the probabilistic damage, assessing the loss to estimate a probability distribution of loss at $S_{EBE}$, and calculating the loss statistic PFL.

56. A system as set forth in claim 54, wherein the PFL component for estimating PFL employing linear assembly-based vulnerability at intensity level $S_{EBE}$, further comprises components for:
defining a facility using a facility defining parameter, the facility defining parameter being selected from a group consisting of location, including latitude and longitude, site soils, substructure, and structural and nonstructural components;
using the defined facility to create an inventory of damageable assemblies and identifying each assembly's engineering demand parameter (EDP);
determining the $S_{EBE}$;
analyzing a structure by calculating a structural response to which each damageable assembly is subjected; and
analyzing damage and loss estimates to calculate an expected total cost to repair the structure according to the following, $$PFL = (1 + \overline{C}_{OP}) \sum_{k=1}^{N} \overline{y}_k(x_k),$$

where subscript k refers to particular assemblies, N refers to a number of damageable assemblies, $\overline{y}_k$, refers to a mean repair cost to assembly k, $x_k$ refers to an engineering demand parameter for assembly k, and $\overline{C}_{OP}$ refers to contractor's mean overhead-and-profit factor.

57. A system as set forth in claim 56, wherein in the component for determining $S_{EBE}$, $S_{EBE}$ is determined using a damped elastic spectral acceleration response at the site's small-amplitude fundamental period of vibration, $S_a(T_1)$, and is adjusted to account for site classification.

58. A system as set forth in claim 57, further comprising a component for calculating a certainty equivalent with the EAL, the certainty equivalent calculated according to the following, $$CE = E[I] - C_0 - E[L] - \frac{\text{Var}[I] + \text{Var}[L]}{2r} - rR,$$

wherein E[I] represents an expected present value of a future net income stream, Co represents a purchase price, E[L] represents an expected present value of future seismic losses, Var[I] represents a variance of the present value of the net income stream and is considered a measure of market risk, Var[L] represents a variance of a present value of future seismic losses, r represents risk tolerance, and R represents remainder terms associated with higher-order moments of income and seismic loss.

59. A system as set forth in claim 55, further comprising a component for calculating a certainty equivalent with the EAL, the certainty equivalent calculated according to the following, $$CE = E[I] - C_0 - E[L] - \frac{\text{Var}[I] + \text{Var}[L]}{2r} - rR,$$

wherein E[I] represents an expected present value of a future net income stream, Co represents a purchase price, E[L] represents an expected present value of future seismic losses, Var[I] represents a variance of the present value of the net income stream and is considered a measure of market risk, Var[L] represents a variance of a present value of future seismic losses, r represents risk tolerance, and R represents remainder terms associated with higher-order moments of income and seismic loss.

60. A system as set forth in claim 47, wherein $S_{EBE}$ is calculated according to the following, $$S_{EBE} = G^{-1}(G_{EBE}),$$

wherein G(s) represents the mean annual exceedance frequency of shaking intensity s, and $G^{-1}(g)$ represents the inverse of G(s) evaluated at a particular value g.

61. A system as set forth in claim 47, further comprising a PFL component for estimating the PFL, the PFL representing a point on a mean seismic vulnerability function for a frequent shaking intensity.

62. A system as set forth in claim 61, wherein in the PFL component, PFL is estimated from a method selected from a group consisting of employing assembly-based vulnerability at intensity level $S_{EBE}$, employing linear assembly-based vulnerability at intensity level $S_{EBE}$, and employing expert opinion.

63. A system as set forth in claim 62, wherein the PFL component for estimating PFL employing assembly-based vulnerability at intensity level $S_{EBE}$, further comprises components for:
selecting a ground-motion time history and creating a stochastic structural model;
performing a non-linear time history structural analysis using the ground-motion time history and the structural model to determine structural response;
assessing probabilistic damage via component fragility functions evaluated using results from the structural response;
assessing loss via probabilistic construction cost-estimation and results of the assessed probabilistic damage; and
repeating selecting the ground-motion time history, creating the stochastic structural model, performing the non-linear structural analysis, assessing the probabilistic damage, assessing the loss to estimate a probability distribution of loss at $S_{EBE}$, and calculating the loss statistic PFL.

64. A system as set forth in claim 62, wherein the PFL component for estimating PFL employing linear assembly-based vulnerability at intensity level $S_{EBE}$, further comprises components for:
defining a facility using a facility defining parameter, the facility defining parameter being selected from a group consisting of location, including latitude and longitude, site soils, substructure, and structural and nonstructural components;
using the defined facility to create an inventory of damageable assemblies and identifying each assembly's engineering demand parameter (EDP);
determining the $S_{EBE}$;
analyzing a structure by calculating a structural response to which each damageable assembly is subjected; and
analyzing damage and loss estimates to calculate an expected total cost to repair the structure according to the following, $$PFL = (1 + \overline{C}_{OP}) \sum_{k=1}^{N} \overline{y}_k(x_k),$$

where subscript k refers to particular assemblies, N refers to a number of damageable assemblies, $\bar{y}_k$ refers to a mean repair cost to assembly k, $x_k$ refers to an engineering demand parameter for assembly k, and $\overline{C}_{OP}$ refers to contractor's mean overhead-and-profit factor.

65. A system as set forth in claim 64, wherein in the component for determining $S_{EBE}$, $S_{EBE}$ is determined using a damped elastic spectral acceleration response at the site's small-amplitude fundamental period of vibration, $S_a(T_1)$, and is adjusted to account for site classification.

66. A system as set forth in claim 47, further comprising a component for calculating a certainty equivalent with the EAL, the certainty equivalent calculated according to the following, $$CE = E[I] - C_0 - E[L] - \frac{\text{Var}[I] + \text{Var}[L]}{2r} - rR,$$

wherein E[I] represents an expected present value of a future net income stream, Co represents a purchase price, E[L] represents an expected present value of future seismic losses, Var[I] represents a variance of the present value of the net income stream and is considered a measure of market risk, Var[L] represents a variance of a present value of future seismic losses, r represents risk tolerance, and R represents remainder terms associated with higher-order moments of income and seismic loss.

67. A system as set forth in claim 47, further comprising a component for defining an economic-basis-earthquake (EBE), the EBE being an event that produces a site shaking with a stated exceedance probability during a stated number of years.

68. A system as set forth in claim 67, wherein in the component for defining the economic-basis-earthquake, the stated exceedance probability is approximately 10% and the stated number of years is approximately 5 years.

\* \* \* \* \*